(12) United States Patent
Eto et al.

(10) Patent No.: US 11,745,337 B2
(45) Date of Patent: *Sep. 5, 2023

(54) HANDLING DEVICE, CONTROL DEVICE, AND COMPUTER PROGRAM PRODUCT

(71) Applicant: Kabushiki Kaisha Toshiba, Minato-ku (JP)

(72) Inventors: Haruna Eto, Kawasaki (JP); Seiji Tokura, Kawasaki (JP); Kazuma Komoda, Kawasaki (JP); Ping Jiang, Ota (JP); Akihito Ogawa, Fujisawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 196 days.

This patent is subject to a terminal disclaimer.

(21) Appl. No.: 16/798,562

(22) Filed: Feb. 24, 2020

(65) Prior Publication Data

US 2021/0060769 A1    Mar. 4, 2021

(30) Foreign Application Priority Data

Aug. 29, 2019   (JP) ................. 2019-156850

(51) Int. Cl.
  *B25J 9/16* (2006.01)
  *B25J 15/00* (2006.01)
  *B65G 61/00* (2006.01)

(52) U.S. Cl.
  CPC .......... *B25J 9/1612* (2013.01); *B25J 9/1664* (2013.01); *B25J 15/00* (2013.01); *B65G 61/00* (2013.01)

(58) Field of Classification Search
  CPC . B25J 9/10; B25J 9/1612; B25J 9/1664; B25J 9/1607; B25J 15/00; B65G 61/00; B65G 47/917; G05B 2219/37357
  See application file for complete search history.

(56) References Cited

U.S. PATENT DOCUMENTS 9,205,558 B1 * 12/2015 Zevenbergen ......... B25J 9/1633
9,457,477 B1 * 10/2016 Rublee ..................... B25J 9/16
(Continued)

FOREIGN PATENT DOCUMENTS

EP    3 616 856 A1    4/2020
JP    09-300255 A    11/1997
(Continued)

OTHER PUBLICATIONS

Borst Ch. et al: "Grasp Planning: How to Choose a Suitable Task Wrench Space", Robotics and Automation, 2004. Proceedings of the 2004 IEEE, International Conference on Robotics and Automation, vol. 1, XP010768295, Apr. 26, 2004, pp. 319-325, DOI:10.1109/ROBOT.2004.1307170, ISBN: 978-0-7803-8232-9.

(Continued)

*Primary Examiner* — Abby Y Lin
*Assistant Examiner* — Dylan Brandon Mooney
(74) *Attorney, Agent, or Firm* — Oblon, McClelland, Maier & Neustadt, L.L.P.

(57) ABSTRACT

A handling device according to an embodiment has a holder, a calculator, and a controller. The holder is capable of holding an object. The calculator calculates an estimated holding safety factor when the holder holds an object. The controller causes the holder to hold the object on the basis of the estimated holding safety factor calculated by the calculator.

15 Claims, 13 Drawing Sheets

(56) References Cited

U.S. PATENT DOCUMENTS

| | | | |
|---|---|---|---|
| 9,498,887 B1* | 11/2016 | Zevenbergen | ....... B65G 47/918 |
| 9,827,670 B1 | 11/2017 | Strauss | |
| 10,556,338 B1 | 2/2020 | Marchese et al. | |
| 2006/0012198 A1 | 1/2006 | Hager et al. | |
| 2011/0268548 A1 | 11/2011 | Doll | |
| 2013/0211593 A1 | 8/2013 | Domae et al. | |
| 2014/0214202 A1 | 7/2014 | Nammoto et al. | |
| 2014/0316572 A1 | 10/2014 | Iwatake | |
| 2014/0316573 A1 | 10/2014 | Iwatake | |
| 2015/0127162 A1 | 5/2015 | Gotou | |
| 2018/0056512 A1* | 3/2018 | Watts | ..................... B25J 9/1664 |
| 2018/0126551 A1* | 5/2018 | Amano | ................... B25J 15/08 |
| 2019/0001508 A1* | 1/2019 | Li | ........................ B25J 15/0009 |
| 2019/0143507 A1 | 5/2019 | Nishina et al. | |
| 2019/0152058 A1 | 5/2019 | Hang et al. | |
| 2019/0283241 A1* | 9/2019 | Eto | ........................... B25J 9/10 |
| 2019/0283251 A1* | 9/2019 | Nakamoto | ............. B25J 9/1638 |
| 2020/0215685 A1 | 7/2020 | Jamali et al. | |
| 2020/0331709 A1 | 10/2020 | Huang et al. | |
| 2020/0376659 A1 | 12/2020 | Diankov et al. | |
| 2021/0060769 A1 | 3/2021 | Eto et al. | |
| 2021/0178579 A1* | 6/2021 | Saunders | ............. B25J 15/0052 |

FOREIGN PATENT DOCUMENTS

| | | |
|---|---|---|
| JP | 2000-254884 A | 9/2000 |
| JP | 2002-36159 A | 2/2002 |
| JP | 2013-39638 A | 2/2013 |
| JP | 5558585 B2 | 7/2014 |
| JP | 6258556 B1 | 1/2018 |
| JP | 6258557 B1 | 1/2018 |
| JP | 2018-58175 A | 4/2018 |
| JP | 6325174 B1 | 5/2018 |
| JP | 6363294 B1 | 7/2018 |
| JP | 6444499 B1 | 12/2018 |
| JP | 2019-89157 | 6/2019 |
| JP | 2019-162685 A | 9/2019 |
| JP | 2020-32479 A | 3/2020 |

OTHER PUBLICATIONS

Matanya B. Horowitz et al: "Combined Grasp and Manipulation Planning as a Trajectory Optimization Problem", 2012 IEEE International Conference on Robotics and Automation, XP032450835, May 14, 2012, pp. 584-591. DOI:10.1109/ICRA.2012.6225104, ISBN: 978-1-4673-1403-9.

Amir M. Ghalamzan E. et al: "Task-Relevant Grasp Selection: A Joint Solution to Planning Grasps and Manipulative Motion Trajectories", 2016 IEEE/RSJ International Conference on Intelligent Robots and Systems (IROS), XP033011508, Oct. 9, 2016, pp. 907-914, DOI: 10.1109/IROS.2016.7759158.

Lopez-Damian E., Sidobre D., Alami R., "A Grasp Planner Based on Inertial Properties", Apr. 2005, IEEE, International Conference on Robotics and Automation, pp. 766-771 (Year: 2005).

Office Action dated May 17, 2022, in co-pending U.S. Appl. No. 17/004,094, 39 pages.

* cited by examiner

HANDLING DEVICE, CONTROL DEVICE, AND COMPUTER PROGRAM PRODUCT

CROSS-REFERENCE TO RELATED APPLICATION

This application claims priority from Japanese Patent Application No. 2019-156850 filed on Aug. 29, 2019, the contents of which are incorporated herein by reference in their entirety.

FIELD

Embodiments described herein relate generally to a handling device, a control device, and a computer program product.

BACKGROUND

In an automation system using a picking system for physical distribution, objects of various sizes and weights are often gripped and transported. Since switching a robot system itself according to a type of an object is costly, it is an issue how to handle various objects with a single robot system. For example, as a robot system, there is a picking system which includes a picking device that moves an object using a picking hand. The picking system causes the picking device to operate on the basis of trajectory information that defines a trajectory in which no interference occurs on a trajectory for placing an object from a first position at a second position.

Incidentally, there is a handling device which includes an end effector (hand) having a plurality of suction cups for adsorbing and gripping an object. The handling device switches between the suction cups to be used such that an adsorption area can be changed according to control of turning ON or OFF a plurality of adsorption valves. In this case, various patterns of gripping method (for example, an end effector, a suction cup to be used, a position and a posture of an object to be gripped, and a combination of these) are considered. Conventionally, when an adsorption surface of an object has a complicated shape, a gripping method capable of ensuring as large an adsorption area as possible with respect to a surface on which the object can be gripped has been given priority. However, a condition in which a weight of an object is large, even if the adsorption area can be ensured, the object may not be able to be stably gripped, for example, the object may drop off depending on the adsorption position.

DETAILED DESCRIPTION

Figure 1:
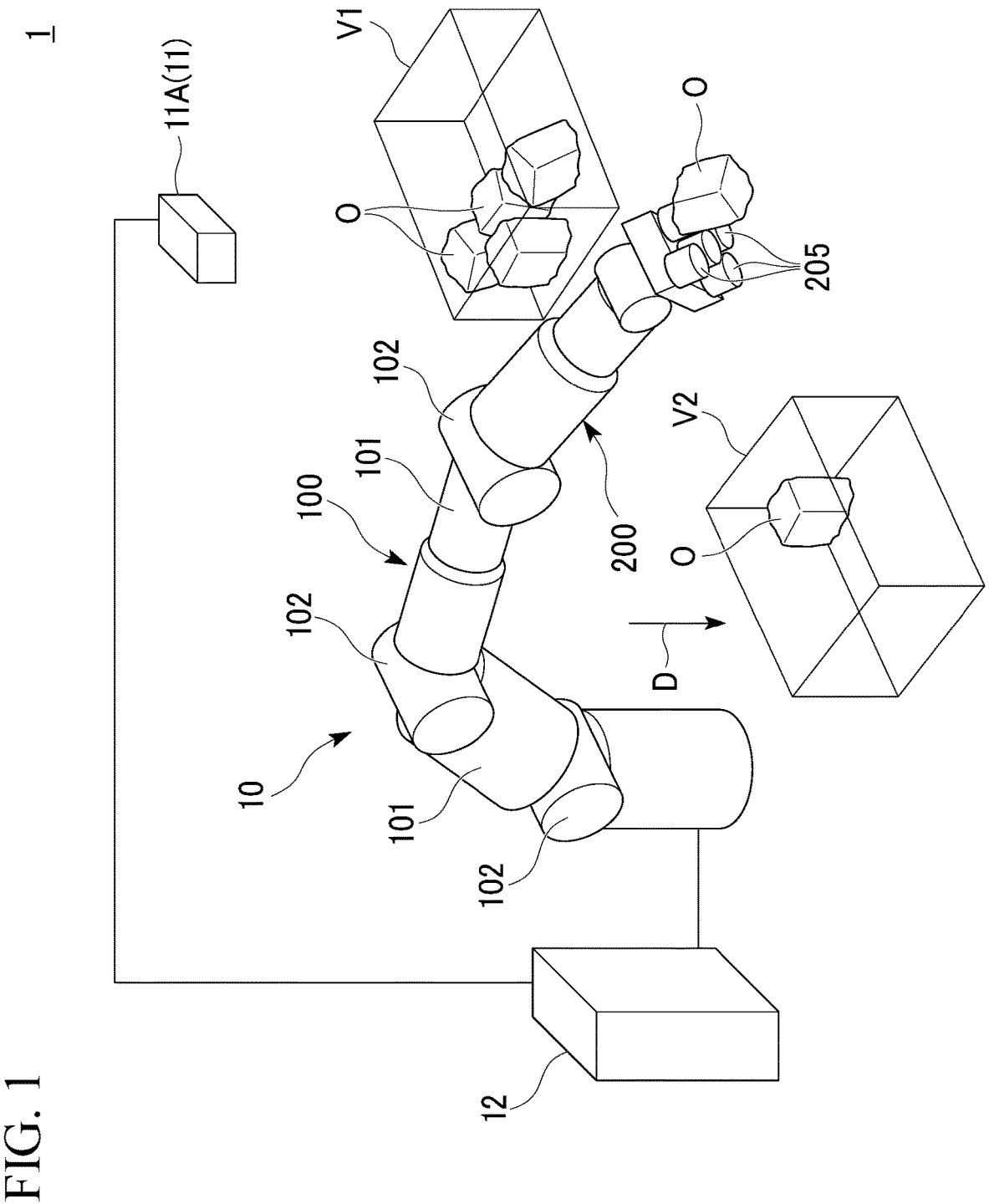
FIG. 1 is a perspective view which schematically shows a transport system according to an embodiment.

A handling device according to an embodiment has a holder, a calculator, and a controller. The holder is capable of holding an object. The calculator calculates an estimated holding safety factor when the holder holds an object. The controller causes the holder to hold the object on the basis of the estimated holding safety factor calculated by the calculator.

In the following description, a handling device and a transport system according to an embodiment will be described with reference to the drawings. Note that the same reference numerals are given to constituents having the same or similar functions in the following description. Then, duplicative description of these constituents may be omitted. In addition, "based on XX" in the present application means "based on at least XX," and includes a case of being based on another element in addition to XX.

Moreover, "based on XX" is not limited to a case in which XX is directly used, and includes a case of being based on an operated or processed XX. "XX" is an arbitrary element (for example, arbitrary information).

One embodiment will be described with reference to FIGS. 1 to 20. FIG. 1 is a perspective view which schematically shows a transport system 1 including a handling device 10 according to the present embodiment. The transport system 1 is, for example, a handling system for physical distribution (picking system). The transport system 1 causes an object (a handling object or a transport object) O positioned in a movement source V1 to move to a movement destination V2.

The movement source V1 is, for example, various types of conveyors, various types of pallets, containers such as totes and fordable containers, or the like. "Container" broadly means a member (for example, a box-shaped member) that can accommodate the object O. However, the movement source V1 is not limited to the example described above. In the following description, the "movement source V1" may be referred to as an "extraction source container V1."

In the movement source V1, various types of objects O with different sizes and weights are randomly placed. For example, the object O to be held has an uneven shape on at least a part of a surface of the object O. In the present embodiment, an outline shape of the object O varies in size from small such as 5 cm square to large such as 30 cm square. In addition, the object O varies in weight from a light one such as several tens of grams to a heavy one such as several kg. However, the size and weight of the object O are not limited to the examples described above.

The movement destination V2 is, for example, a container such as a tote or a fordable container. However, the movement destination V2 is not limited to the examples described above. In the following description, the "movement destination V2" may be referred to as a "transport destination container V2," and each of the "movement source V1" and the "movement destination V2" may be simply referred to as a "container." However, the handling device 10 and the transport system 1 may cause the object O to move to the movement destination V2 other than a container.

Additionally, the handling device 10 and the transport system 1 are not limited to a handling system for physical distribution, and can be widely applied to industrial robot systems, other systems, and the like. The "handling device" and the "transport system" in the present application are not limited to devices and systems that mainly transports objects, and also include devices and systems that perform transport (movement) of an object as a part of product assembly or another purpose.

First, an overall configuration of the transport system 1 will be described.

Figure 4:
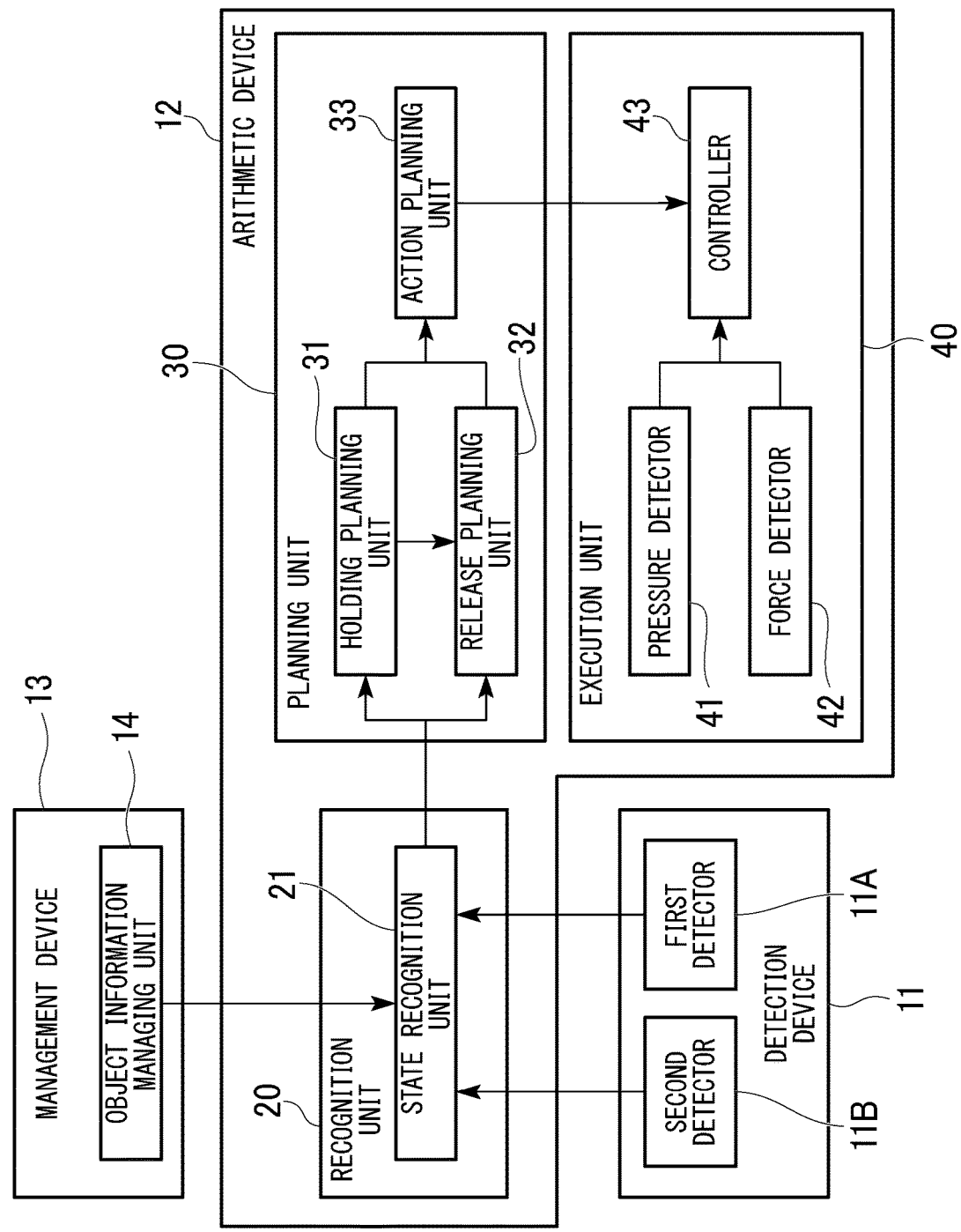
FIG. 4 is a block diagram which shows a system configuration of the transport system according to the embodiment.

As shown in FIG. 1, the transport system 1 includes, for example, a handling device 10, a detection device 11, an arithmetic device 12, and a management device 13 (refer to FIG. 4).

The handling device 10 is, for example, a robot device. The handling device 10 holds an object O positioned in the extraction source container V1, and causes the held object O to move to the transport destination container V2 (a storage area). The handling device 10 can communicate with the management device 13 (refer to FIG. 4) in a wired or wireless manner.

The detection device 11 includes, for example, a plurality of detectors 11A and 11B (refer to FIG. 4). In the example of FIG. 1, a detector 11A (hereinafter, also referred to as a "first detector 11A") disposed near the extraction source container V1 (for example, directly above or obliquely above the extraction source container V1) among the plurality of detectors 11A and 11B is shown. For example, the first detector 11A is a camera or various types of sensors. The first detector 11A acquires, for example, information on the object O positioned in the extraction source container V1 and information on the extraction source container V1.

The information acquired by the first detector 11A is, for example, at least one of "image data," "distance image data," and "shape data." The "distance image data" is image data having distance information in one or more directions (for example, depth information from an arbitrary reference plane set above the extraction source container V1). The "shape data" is information indicating an outline shape and the like of the object O. The information detected by the first detector 11A is output to the arithmetic device 12.

The information detected by the first detector 11A may also be output to the management device 13 (refer to FIG. 4).

Note that the first detector 11A may be provided as a part of the handling device 10. In this case, the information detected by the first detector 11A may be directly output to the arithmetic device 12 of the handling device 10.

Note that the handling device 10 may have a configuration in which it can acquire information on the object O positioned in the extraction source container V1 and information on the extraction source container V1 before it performs an operation of extracting the object O from the extraction source container V1. In this case, the information on the object O positioned in the extraction source container V1 and the information on the extraction source container V1 may not be acquired using the first detector 11A.

For example, the information on the object O positioned in the extraction source container V1 and the information on the extraction source container V1 may be registered in a database on a server (not shown) in advance. For example, the arithmetic device 12 or the management device 13 may be configured to acquire the information on the object O positioned in the extraction source container V1 and the information on the extraction source container V1 from the database.

However, for example, a position, a posture, and the like of the object O may change due to occurrence of shaking or the like during an operation of a system. For this reason, it is preferable that the transport system 1 have a configuration in which it can acquire latest information on the object O and the extraction source container V1.

The detection device 11 includes a detector 11B (hereinafter, also referred to as a "second detector 11B," refer to FIG. 4) disposed near the transport destination container V2 (for example, directly above or obliquely above the transport destination container V2). For example, the second detector 11B is a camera or various types of sensors. The second detector 11B detects, for example, information on a shape (including a shape of an inner wall surface or a partition) of the transport destination container V2 and information on the object O previously placed in the transport destination container V2.

The information detected by the second detector 11B is, for example, at least one of "image data," "distance image data," and "shape data."

Note that the second detector 11B may also be provided as a part of the handling device 10. In this case, the information detected by the second detector 11B may be directly output to the arithmetic device 12 of the handling device 10.

The arithmetic device 12 (control device) performs overall control of the transport system 1. For example, the arithmetic device 12 acquires the information included in the management device 13 and information detected by the detection device 11 (the first detector 11A and the second detector 11B), and outputs the acquired information to the handling device 10.

The arithmetic device 12 includes, for example, a recognition unit 20, a planning unit 30, and an execution unit 40 (refer to FIG. 4).

The management device 13 (refer to FIG. 4) manages the entire transport system 1. As shown in FIG. 4, the management device 13 includes, for example, an object information managing unit 14 that manages information on an object. For example, the object information managing unit 14 acquires the information on an object detected by the first detector 11A and the second detector 11B and manages the acquired information.

Next, the handling device 10 will be described.

As shown in FIG. 1, the handling device 10 includes, for example, a moving mechanism 100 and a holder 200.

The moving mechanism 100 is a mechanism which causes the holder 200 to move to a desired position. For example, the moving mechanism 100 is a 6-axis vertical articulated robot arm. The moving mechanism 100 includes, for example, a plurality of arm members 101 and a plurality of rotators 102 that connect the plurality of arm members 101 in a rotatable manner.

However, the moving mechanism 100 may be a three-axis orthogonal robot arm, or may be a mechanism that causes the holder 200 to move to a desired position according to another configuration. For example, the moving mechanism 100 may be a flying body (for example, a drone) that lifts and causes the holder 200 to move with the rotary wing.

The holder 200 is a holding mechanism that holds the object O positioned in the extraction source container V1. The holder 200 is connected to the moving mechanism 100 via the rotator 202 (refer to FIG. 2). For example, the holder 200 includes a suction device 203 (refer to FIG. 2) and an adsorption unit 205 communicating with the suction device 203. The holder 200 holds the object O using, for example, adsorption.

However, the holder 200 may be a holder that holds the object O by pinching the object using a plurality of pinching members, or may be a holder that holds the object O using another mechanism. For example, the holder 200 may be a holder that holds the object O using a magnetic force. For example, the holder 200 may be a holder (for example, a jamming gripper) which is configured by a flexible membrane filled with powder and a vacuum pump for taking out air from the flexible membrane, and holds the object O using a jamming phenomenon. Note that an example in which the holder 200 has an adsorption unit 205 will be described in the following description.

Figure 2:
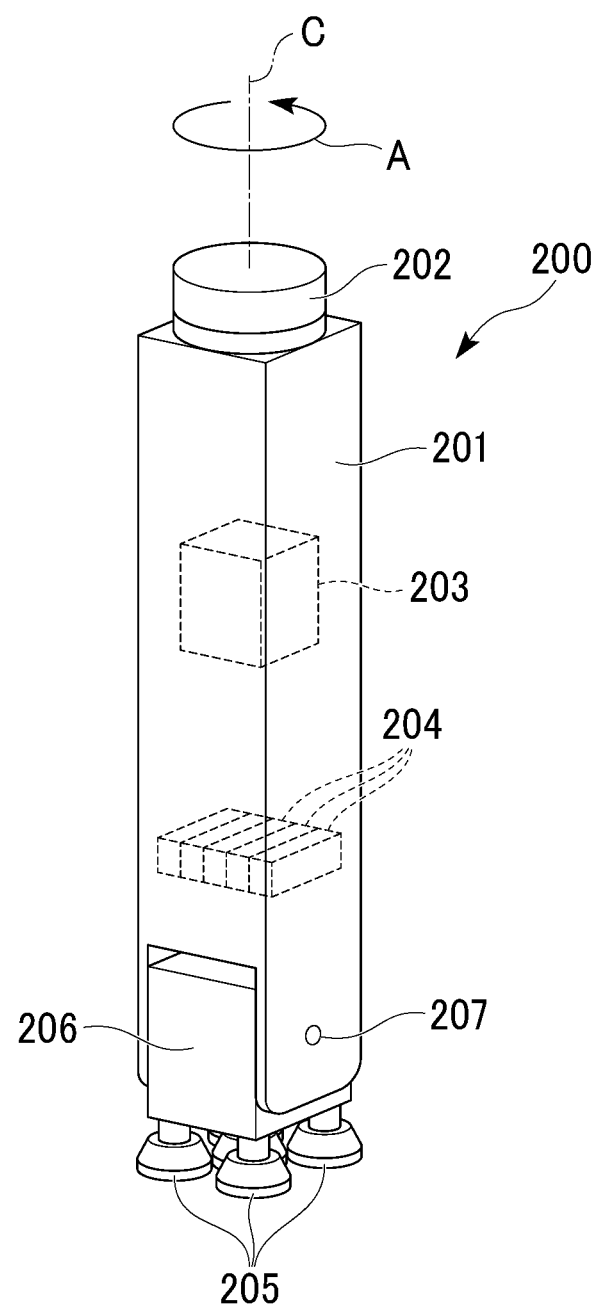
FIG. 2 is a perspective view which shows a holder according to the embodiment.

FIG. 2 is a perspective view which shows the holder 200 of the embodiment. The holder 200 includes, for example, a base 201, a rotator 202, a suction device 203, a plurality of switching valves 204, a plurality of adsorption units 205 (for example, suction cups), a base tip portion 206, and a rotator 207.

The base 201 has, for example, a rectangular parallelepiped outline shape. The base 201 forms an outline of the holder 200. The base 201 is connected to the moving mechanism 100 (refer to FIG. 1) via the rotator 202. Note that the base 201 may have a cylindrical outline shape. Moreover, the base 201 may be formed in a box shape or may be configured only by a frame.

The rotator 202 is provided between the base 201 and the moving mechanism 100 (refer to FIG. 1). The rotator 202 connects the base 201 to the moving mechanism 100 in a rotatable manner. A rotation center axis C of the rotator 202 substantially coincides with a direction in which a tip portion of the moving mechanism 100 and the base 201 are arranged. The rotator 202 can cause the base 201 of the holder 200 to rotate with respect to the moving mechanism 100 in an A direction and in the opposite direction thereto (a circumferential direction around the rotation center axis C) in FIG. 2. Note that the rotator 202 may be provided as a part of the moving mechanism 100 instead of a part of the holder 200.

The suction device 203 is provided inside the base 201. The suction device 203 is, for example, a vacuum pump. The suction device 203 communicates with each of the plurality of adsorption units 205 via a hose or the like. Due to the suction device 203 being driven, the pressure in each adsorption unit 205 becomes lower than then atmospheric pressure and the object O is adsorbed and held by the adsorption unit 205.

The plurality of switching valves 204 are provided in one to one correspondence with respect to the plurality of adsorption units 205. Each of the switching valves 204 can switch between a first state in which a corresponding adsorption unit 205 and the suction device 203 are communicating and a second state in which the corresponding adsorption unit 205 and the suction device 203 are not communicating. The second state is a state in which communication between the adsorption unit 205 and the suction device 203 is blocked and the adsorption unit 205 communicates with outside of the handling device 10 (an atmospheric pressure space).

In the following description, the adsorption unit 205 used for holding the object O is referred to as an "effective adsorption unit 205E." For example, when the object O is relatively small, the handling device 10 causes only one or a small number of adsorption units 205 selected from the plurality of adsorption units 205 to function as the effective adsorption unit 205E. For example, when the handling device 10 holds a vicinity of the center of gravity of the object O, it causes only one or a small number of adsorption units 205 selected from the plurality of adsorption units 205 to function as the effective adsorption unit 205E. In some drawings to be described below, it is shown that the effective adsorption unit 205E among the plurality of adsorption units 205 is distinguished from the other adsorption units 205 by adding a dot pattern to the effective adsorption unit 205E.

The plurality of adsorption units 205 are arranged side by side at one end of the base tip portion 206. The adsorption unit 205 has a smaller outline than the smallest object positioned in the extraction source container V1. The handling device 10 adsorbs and holds the object O only using one or more effective adsorption units 205E selected from the plurality of adsorption units 205.

The base tip portion 206 is connected to one end of the base 201 via the rotator 207. In the present embodiment, five adsorption units 205 are provided in the base tip portion 206.

The rotator 207 is provided between the base tip portion 206 and the base 201. The rotator 207 connects the base tip portion 206 to the base 201 in a rotatable manner.

As described above, the moving mechanism 100 is a 6-axis vertical articulated robot arm, and can take various positions and postures. Furthermore, since the base tip portion 206 and the rotator 207 described above are provided, a single axis degree of freedom is given to the tip of the holder 200. As a result, the following effects are achieved. For example, when a person extracts an object in a deep-bottomed box, the person can adopt various hand postures simply by inserting an arm straight in from the top of the box, rotating the arm in a horizontal direction, and performing a motion of tilting the wrist. Like the human arm and hand, the moving mechanism 100 can also adopt various postures for gripping an object.

As described above, the first detector 11A for recognizing the object O inside the extraction source container V1 is provided on a top of the extraction source container V1. In this case, there is a possibility that some misalignment may occur before and after an operation of gripping the object O due to various errors generated in a movement of the object O. On the other hand, for example, the handling device 10 may cause the gripped object O to move such that it passes in front of a laser range finder (LRF) (not shown). As a result, the handling device 10 can check a gripping state of the object O, and recognize a positional relationship between the holder 200 and the object O more accurately.

For example, it is preferable that the LRF be provided in the vicinity of a movement route when the holder 200 moves toward the transport destination container V2. In this case, the handling device 10 can check the gripping state of the object O with fewer operations. As a result, an operation time of the entire system is shortened.

Figure 3:
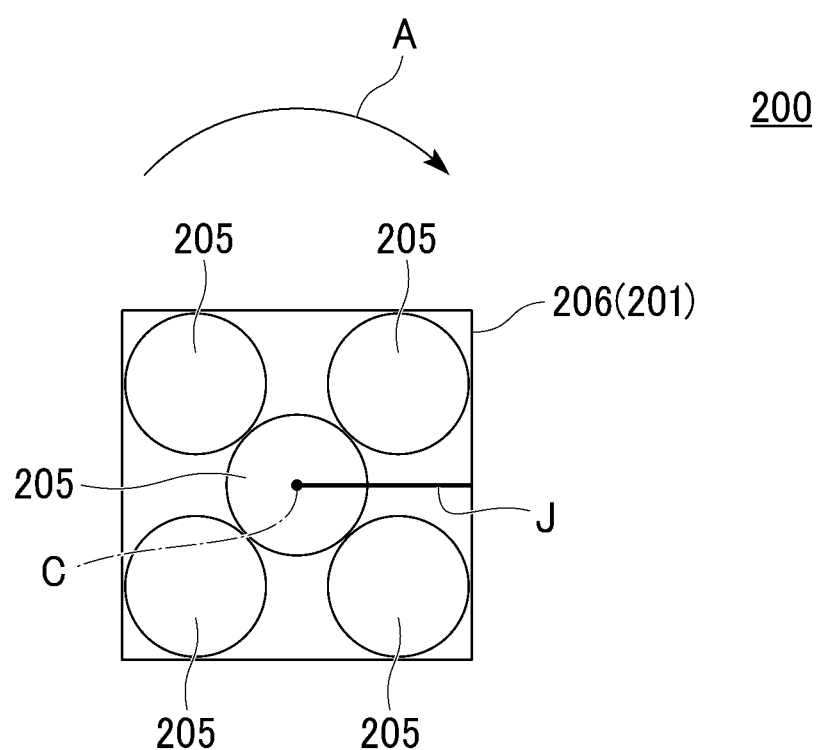
FIG. 3 is a bottom view which shows an arrangement layout of a plurality of adsorption units according to the embodiment.

FIG. 3 is a bottom view which shows an arrangement layout of the plurality of adsorption units 205 according to the present embodiment. In the present embodiment, an outline of the holder 200 (for example, an outline of the base 201 or the base tip portion 206) is, for example, a square shape of 12 cm×12 cm. As described above, the holder 200 has five adsorption units 205. The five adsorption units 205 include one adsorption unit 205 disposed substantially at a center of the holder 200, and four adsorption units 205 separately disposed at the circumference of the adsorption unit 205 described above so as to correspond to four corners of the holder 200. These four adsorption units 205 can rotate around the rotation center axis C of the rotator 202 in the A direction and the opposite direction thereto by rotation of the rotator 202 (refer to FIG. 2).

Next, the arithmetic device 12 (control device) will be described. The arithmetic device 12 performs overall control of the handling device 10. FIG. 4 is a block diagram which shows a system configuration of the transport system 1. For example, the arithmetic device 12 acquires the information included in the management device 13 and the information detected by the detection device 11 (the first detector 11A and the second detector 11B), and outputs the acquired information to the handling device 10 (refer to FIG. 1). The arithmetic device 12 includes, for example, a recognition unit 20, a planning unit 30, an execution unit 40, and a storage (not shown).

All or some of functional units (for example, the recognition unit 20, the planning unit 30, and the execution unit 40) of the arithmetic device 12 are realized, for example, by one or more processors such as a central processing unit (CPU) or a graphics processing unit (GPU) executing a program stored in a program memory. However, all or some of these functional units may be realized by hardware (for example, a circuitry) such as a large scale integration (LSI), an application specific integrated circuit (ASIC), a field-programmable gate array (FPGA), a programmable logic device (PLD), or the like. In addition, all or some of the functional units described above may also be realized by a combination of a software functional unit and the hardware. The storage is realized by a flash memory, an electrically erasable programmable read-only memory (EEPROM), a read-only memory (ROM), a random access memory (RAM), or the like.

First, a storage will be described. For example, information indicating an outline of the holder 200 (hereinafter, referred to as "holder outline information") is stored in the storage.

The "holder outline information" includes information indicating the outline of the holder 200 when viewed from, for example, a specific direction D (refer to FIG. 1). The specific direction D is, for example, a direction in which the object O and the holder 200 overlap at a timing at which the object O is placed in the transport destination container V2 (for example, a timing immediately before the object O is released). In other words, the "specific direction D" is a direction in which the adsorption unit 205 comes into contact with the object O when the holder 200 having the adsorption unit 205 is provided.

Note that the holder outline information may be stored in the management device 13 instead of being stored in the storage of the handling device 10. In addition, the holder outline information may be stored in another device with which the handling device 10 can communicate via a network.

Next, each functional unit of the arithmetic device 12 will be described.

The recognition unit 20 acquires the information included in the management device 13 and the information detected by the detection device 11 (the first detector 11A and the second detector 11B), and recognizes states of various elements used for control of the handling device 10. For example, the recognition unit 20 includes a state recognition unit 21 that recognizes the states of various elements. For example, the state recognition unit 21 generates at least a part of information on the states of various elements by performing predetermined image processing on image data or distance image data. For example, the information on the states of various elements includes "object outline information," "object position and posture information," "object center of gravity information," and "container information." The recognition unit 20 outputs these types of information to the planning unit 30.

The "object outline information" is, for example, information derived from image data of the object O, distance image data of the object O, shape data of the object O, or at least one of these. The "object outline information" is information indicating an outline of the object O (the object O to be held) positioned in the extraction source container V1. The "object outline information" includes, for example, information indicating the outline of the object O when viewed from the specific direction D. For example, the "object outline information" may include information on planar/non-planar surfaces of the object.

Figure 5:
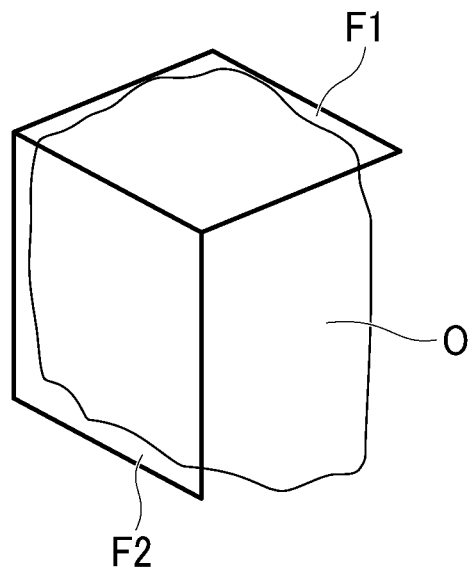
FIG. 5 is a perspective view which shows an example of object information according to the embodiment.
Figure 6:
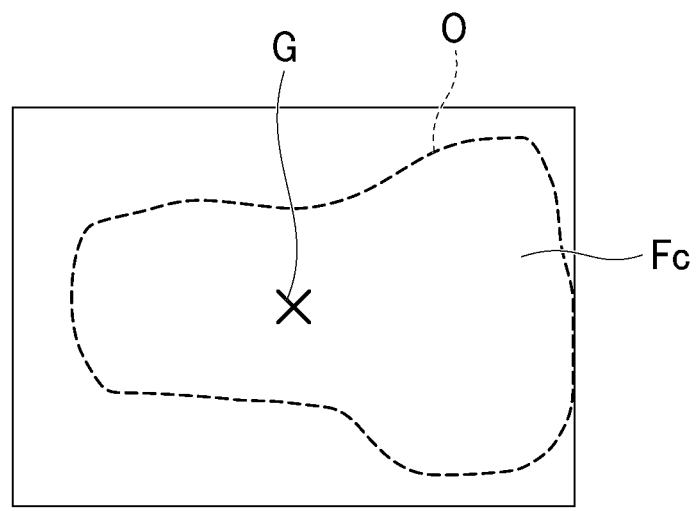
FIG. 6 is a plan view which shows an example of the object information according to the embodiment.

For example, the object outline information includes information on a first surface F1 of a rectangular parallelepiped shape circumscribing the object O and a second surface F2 adjacent to the first surface F1 (refer to FIG. 5). For example, when the object surface is a non-plane (when there is an unevenness on the object surface), the state recognition unit 21 recognizes a rectangular parallelepiped shape circumscribing an outmost convex portion of the object surface as outline information (refer to FIG. 6). For example, the state recognition unit 21 recognizes the outline shape when viewed from the specific direction as a holdable area Fc of the object.

The holdable area Fc is a plane portion that can be adsorbed on the object surface.

The "object position and posture information" is, for example, information derived from the image data of the object O, the distance image data of the object O, the shape data of the object O, or at least one of these. The "object position and posture information" is information indicating the position and posture of the object O positioned in the extraction source container V1. The "object position and posture information" includes, for example, information indicating an arrangement position of the object O in the extraction source container V1, and the posture (for example, a degree of inclination of the object surface with respect to a horizontal plane) of the object O.

The "object center of gravity information" is, for example, information derived from the image data of the object O, the distance image data of the object O, the shape data of the object O, weight data of the object O, or at least one of these. The "object center of gravity information" is information indicating a center of gravity position G of an object. For example, the "object center of gravity information" is positional information of a centroid of a captured image obtained when it is assumed that an object is formed of the same materials. For example, the state recognition unit 21 recognizes the center of gravity position G of an object on the basis of three-dimensional information in which it is assumed that an object has a uniform density.

The "container information" includes, for example, "movement source shape information," "movement destination shape information," and "movement destination loading information."

The "movement source shape information" is information indicating a shape of the extraction source container V1 that is an obstacle when the object O in the extraction source container V1 is held by the holder 200. The state recognition unit 21 recognizes, for example, the "movement source shape information" based on the information detected by the first detector 11A.

The "movement destination shape information" is information indicating a shape of the transport destination container V2 that is an obstacle when the object O is moved to the transport destination container V2. For example, the "movement destination shape information" is information indicating a wall that defines an inner wall surface of the transport destination container V2 or a partition provided inside the transport destination container V2.

The "movement destination loading information" is information indicating the object O previously placed in the transport destination container V2.

The state recognition unit 21 recognizes the "movement destination shape information" and the "movement destination loading information" based on, for example, the information detected by the second detector 11B.

Next, the planning unit 30 will be described.

For example, the planning unit 30 includes a holding planning unit 31 (calculator), a release planning unit 32, and an action planning unit 33.

The holding planning unit 31 generates a holding plan for holding the object O positioned in the extraction source container V1 using the holder 200.

The release planning unit 32 (release planning unit) generates a release plan for releasing the object O held by the holder 200 in the transport destination container V2.

The action planning unit 33 generates a movement plan for causing the object O held by the holder 200 to move to the transport destination container V2. The action planning unit 33 outputs the generated movement plan to the controller 43.

Next, the execution unit 40 will be described.

For example, the execution unit 40 includes a pressure detector 41, a force detector 42, and a controller 43.

The pressure detector 41 generates pressure information obtained from a pressure sensor or the like that detects an internal pressure of the adsorption unit 205. The pressure detector 41 outputs the generated pressure information to the controller 43.

The force detector 42 generates force information obtained from a force sensor or the like that can estimate a force generated at a tip of an end effector (the holder 200). The force detector 42 outputs the generated force information to the controller 43.

The controller 43 executes a holding operation, a transport operation, and a release operation of the object O using the holder 200 on the basis of a movement plan output by the action planning unit 33, pressure information output by the pressure detector 41, and force information output by the force detector 42. The controller 43 detects a holding state of the holder 200 and a state of contact between the object O and the circumference of the object O held by the holder 200, and executes an appropriate retry operation.

Next, processing of the holding planning unit 31 will be described.

For example, the holding planning unit 31 calculates holding methods of the holder 200 (a plurality of holding methods at the time of holding the object O using the holder 200) and outputs the best method among the calculated holding methods to the action planning unit 33 based on information output by the state recognition unit 21. The holding method means a holding position, a holding posture, and a combination of these at the time of holding the object O using the holder 200.

The "holding position" means a position at which the object O is held in the holder 200, which changes when the holder 200 is translated with respect to the object O. That is, the "holding position" indicates a range in which the object O overlaps in a range represented by the outline of the holder 200 when viewed from a direction in which the object O and the holder 200 overlap. Note that the holding position of the holder 200 can change according to an operation of the moving mechanism 100.

The "holding posture" means an angular position (rotational position in the A direction) of the holder 200 with respect to the object O. The holding posture of the holder 200 can change according to a rotation of the rotator 202.

The handling device 10 described above can cause the holder 200 to freely operate, for example, shift at intervals of 1 mm or rotate at intervals of 1 degree. For this reason, the handling device 10 can grip the object O in various holding postures and holding positions. While the handling device 10 enables dexterous handling in this manner, it is important whether the best holding method for an entire system can be selected.

In the present embodiment, while a plurality of holding methods are comprehensively searched, a safety factor in each holding method is estimated, and a holding method with the highest safety factor is selected. The holding planning unit 31 calculates an estimated holding safety factor ratio as a safety factor when the holder 200 holds the object O (refer to Equation (2), Equation (3)).

The holding planning unit 31 calculates an estimated holding safety factor ratio on the basis of the contact area information regarding an area in which the holder 200 and the object O are in contact and the distance information (refer to FIG. 8) regarding a distance L between a center K (hereinafter, also referred to as a "contact surface center K") of the contact surface on which the holder 200 and the object O are in contact and a center of gravity G of the object O.

Here, a pressure which enables adsorption of the contact surface on which the holder 200 and the object O are in contact is set as an "adsorption pressure," and a value indicating a stress obtained by dividing the distance L between the contact surface center K and the center of gravity G of the object by a geometrical moment of inertia I with the contact surface of the holder 200 and the object O as a cross-section is set as a "divided stress value."

The holding planning unit 31 calculates the estimated holding safety factor ratio on the basis of a numerical value obtained by dividing the adsorption pressure by a divided stress value.

The estimated holding safety factor ratio is a value obtained by dividing the adsorption pressure in an arbitrary holding method by a value obtained by adding a bending stress and other generated tensile stresses.

The bending stress is calculated according to a following equation (1).

[Math 1]

$$\sigma(x) = M\frac{x}{I} \qquad (1)$$

Figure 7:
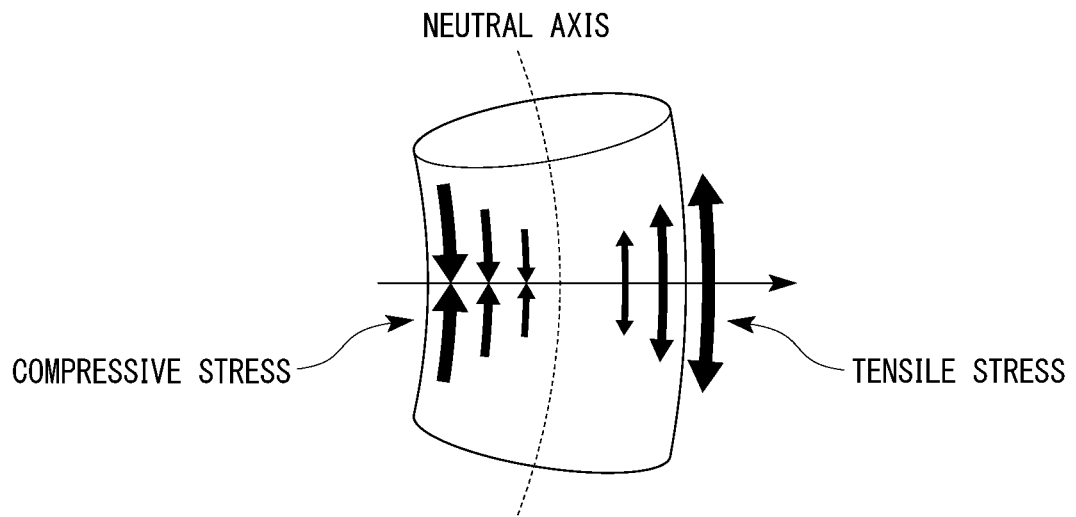
FIG. 7 is a diagram which describes a bending stress that a structure receives.

In Equation (1), $\sigma(x)$ is a bending stress, M is a moment, I is a geometrical moment of inertia, and x is a distance from a neutral axis. FIG. 7 shows a model when the bending stress is applied to a structure. As shown in FIG. 7, when the bending stress is applied to a structure, a tensile stress and a compressive stress are generated in the structure.

When the bending stress is applied to the structure, the structure breaks when the maximum bending stress is greater than the tensile stress that the structure can withstand.

In the case of adsorption, when the maximum bending stress is greater than a vacuum pressure for each adsorption unit 205, it can be considered that the adsorption unit 205 will peel off from the object O to be adsorbed.

The estimated holding safety factor ratio is calculated according to the following equation (2).

[Math 2]

$$\text{ratio} = \frac{P}{\sigma + T_s} \qquad (2)$$

In Equation (2), P is a vacuum pressure (adsorption pressure) of an arbitrary holding method, $\sigma$ is the bending stress, and Ts is the other generated tensile stresses. In the present embodiment, the estimated holding safety factor ratio is a value obtained by dividing an adsorption pressure in an arbitrary holding method by a bending stress because the other generated tensile stresses Ts are omitted. If the other generated tensile stresses Ts are omitted, the estimated holding safety factor ratio is calculated according to a following equation (3).

[Math 3]

$$\text{ratio} = \frac{P}{M \times \frac{R}{I}} \qquad (3)$$

Figure 8:
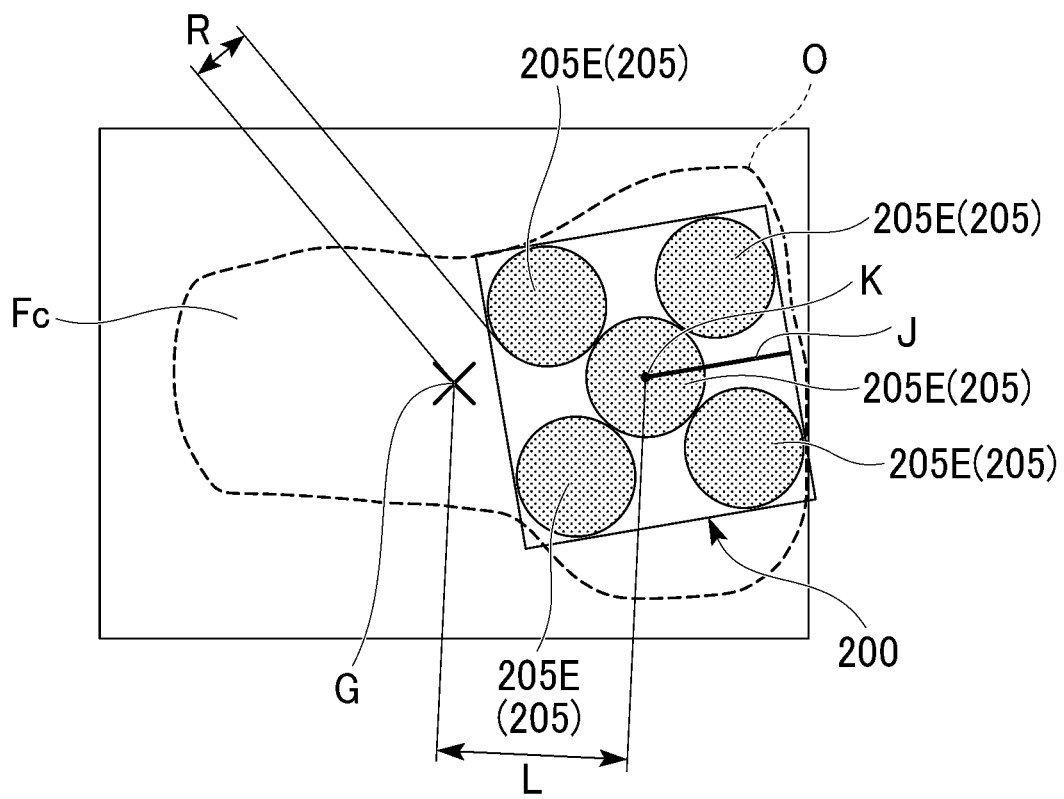
FIG. 8 is a diagram which describes distance information for a distance between a center of a contact surface on which a holder and an object are in contact and a center of gravity of the object.

In Equation (3), M is a moment determined by a distance L between the contact surface center K and the center of gravity G of the object, R is the shortest distance between an adsorption surface contour and the center of gravity G of the object, and I is a geometrical moment of inertia determined by an arbitrary holding method. In the example of FIG. 8, a case in which the center of gravity G of the object is positioned outside the adsorption surface is shown. In this case, the shortest distance R is an interval between a contour of the effective adsorption unit 205E closest to the center of gravity G of the object and the center of gravity G of the object. A part of the adsorption surface which is the most easily peeled off is the contour of the effective adsorption unit 205E closest to the center of gravity G of the object. In the following description, the contour part of the effective adsorption unit 205E closest to the center of gravity G of the object is also referred to as a "dangerous part."

As described above, the geometrical moment of inertia I needs to be calculated to calculate the estimated holding safety factor ratio. In the case of the holder 200 having the plurality of adsorption units 205, the number of combined patterns of the adsorption unit 205 is determined according to the number of switching valves 204 (refer to FIG. 2) to which the plurality of adsorption units 205 are connected. For example, when the number of switching valves 204 that can be controlled independently is N, the number of combined patterns Q of the adsorption units 205 is calculated by the following equation (4).

[Math 4]

$$Q = \Sigma_{i=1}^{i=N} {}_N C_i \qquad (4)$$

For example, the holder 200 having five switching valves 204 that can be controlled independently for five adsorption units 205 will be described. In this case, the number Q of possible patterns is 31.

Figure 9:
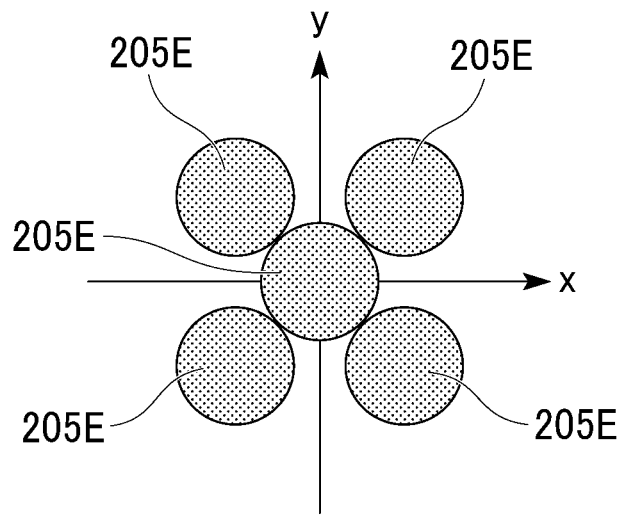
FIG. 9 is a diagram which describes a contact area in which the holder and an object are in contact.

For example, in the case of a pattern in which all of the five adsorption units 205 are used, a distribution direction of the effective adsorption unit 205E has no anisotropy (refer to FIG. 9). In this case, there is no difference between a bending strength in an x-axis direction and a bending strength in a y-axis direction in any xy coordinate system.

Figure 10:
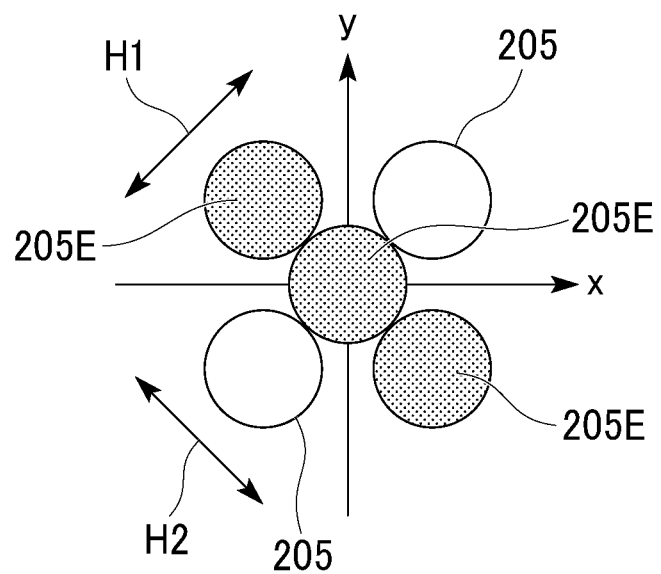
FIG. 10 is a diagram which describes a direction of contact distribution.
Figure 11:
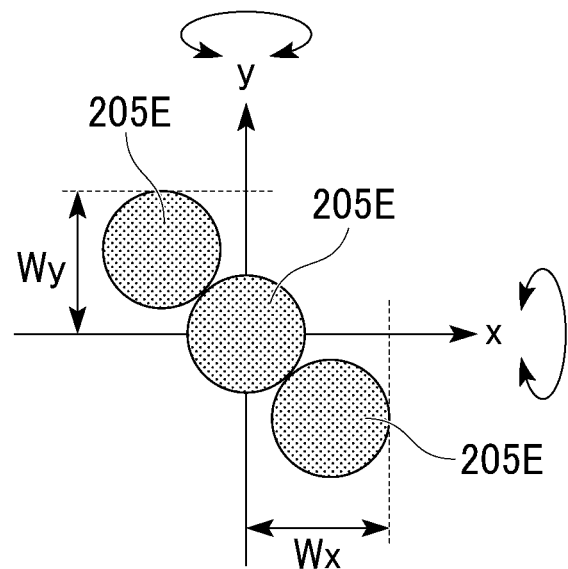
FIG. 11 is a diagram which describes a method of calculating a geometrical moment of inertia.

On the other hand, in the case of a pattern in which three adsorption units 205 are arranged in a line (when three effective adsorption units 205E are arranged in a line), the distribution direction of the effective adsorption unit 205E has anisotropy (refer to FIG. 10). In this case, there is strength in response to bending when a load is applied in the arrangement direction of the effective adsorption unit 205E, and weakness in response to bending when a load is applied in a direction orthogonal to the arrangement direction of the effective adsorption unit 205E. In this case, there is no difference in numerical value between the bending strength in the x-axis direction and the bending strength in the y-axis direction in the xy coordinates as shown in FIG. 10, and there is a need to consider this by rotating the coordinates. These bending strengths are referred to as geometrical moments of inertia around the x-axis and around the y-axis (refer to FIG. 11). In FIG. 11, a reference sign Wx indicates a value on the x-axis at which the tension has the maximum value, and a reference sign Wy indicates a value on the y-axis at which the tension has the maximum value, respectively.

Figure 12:
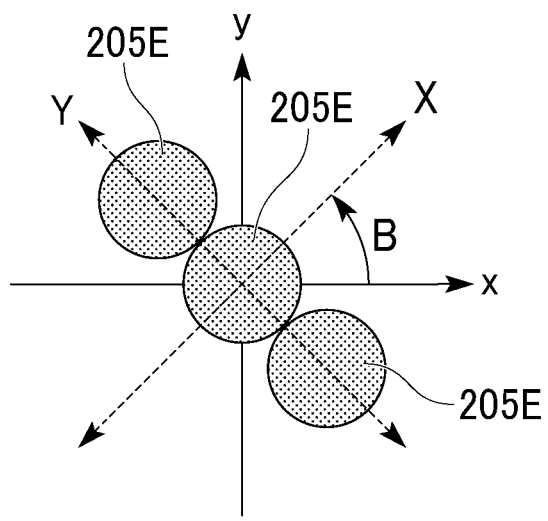
FIG. 12 is a diagram which describes a method of calculating an angle of a main axis.

A rotation angle to a coordinate system in which the difference between the geometrical moments of inertia around the x axis and around the y axis is the largest is referred to a main axis angle B (refer to FIG. 12). As shown in FIG. 12, a case in which three effective adsorption units 205E are arranged in a line and the xy coordinates are rotated by an angle B to be set as XY coordinates will be considered. In this case, it is weak against bending by an applied load in the X-axis direction and is strong against bending by an applied load in the Y-axis direction.

A geometrical moment of inertia Ix around the x axis, a geometrical moment of inertia Iy around the y axis, a cross-section synergistic moment Ixy, and the main axis angle B can be obtained by the following formulas (5) to (8), respectively.

[Math 5]
$$I_X = \int\int_S V^2 dXdY \quad (5)$$

[Math 6]
$$I_Y = \int\int_S X^2 dXdY \quad (6)$$

[Math 7]
$$I_{XY} = \int\int_S XY dXdY \quad (7)$$

[Math 8]
$$B = \frac{1}{2}\tan^{-1}\left(-\frac{2I_{xy}}{I_x - I_y}\right) \quad (8)$$

As an example, a method of calculating a geometrical moment of inertia $I_{circle}$ in the case of a circular cross section is shown in the following equation (9).

[Math 9]
$$I_{circle} = \frac{\pi d^4}{64} = \frac{xy^4}{4} \quad (9)$$

The geometrical moment of inertia Ix around the x axis and the geometrical moment of inertia Iy around the y axis in the case of a circular cross section can be obtained by the following equations (10) and (11), respectively. In the equations (10) and (11), Np is the number of effective adsorption units.

[Math 10]
$$I_x = \int y^2 dA = \Sigma^{Np}(I_{circle} + y^2 \cdot \pi r^2) \quad (10)$$

[Math 11]
$$I_y = \int x^2 dA = \Sigma^{Np}(I_{circle} + x^2 \cdot \pi r^2) \quad (11)$$

For example, the main axis angle B may be calculated in advance when the system is started, and stored in a memory as table data. As a result, it is possible to curb an increase in a calculation time for the holding planning unit 31.

A rough estimated holding safety factor ratio can be estimated by performing bending stress calculation in which it is assumed that a weight of an object itself is generated on a weak axis (an axis in a direction orthogonal to the arrangement direction of the effective adsorption unit 205E) using the main axis angle B.

In the case of more accurate calculation, the coordinates are rotated by 180 degrees in one degree increments for all combinations (31 patterns) of each adsorption unit 205, and all values of the geometrical moments of inertia I around the x axis and the y axis at each angle may be registered. In this case, at the time of calculating the estimated holding safety factor ratio, more accurate calculation is possible by selecting the geometrical moment of inertia I with an appropriate rotation angle such that the x axis or the y axis passes through a dangerous part and a centroid of an adsorption pattern.

The holding planning unit 31 calculates a direction of contact distribution related to a distribution on the contact surface on which the holder 200 and the object O are in contact. Here, when the aspect ratio of a contact area in which the holder 200 and the object O are in contact is greater than 1, a direction that intersects a direction with a smallest spread degree in the distribution on the contact surface is defined as a "specific distribution direction." A "length" of the contact area corresponds to a length in a direction with a largest spread degree in the distribution on the contact surface. A "width" of the contact area corresponds to a length in the direction with the smallest spread degree in the distribution on the contact surface (a direction orthogonal to a longitudinal direction of "length").

In the present embodiment, the specific distribution direction is a direction orthogonal to the direction with the smallest spread degree in the distribution on the contact surface. In the example of FIG. 10, the direction with the smallest spread degree in the distribution on the contact surface is indicated as H1, and the direction (the specific distribution direction) orthogonal to the direction H1 is indicated as H2. That is, the specific distribution direction H2 is the direction with the largest spread degree in the distribution on the contact surface. In the example of FIG. 10, the specific distribution direction H2 is a direction in which three effective adsorption units 205E are arranged in a line. The specific distribution direction H2 is a direction with a strongest bending with respect to an applied load in this direction.

Figure 13:
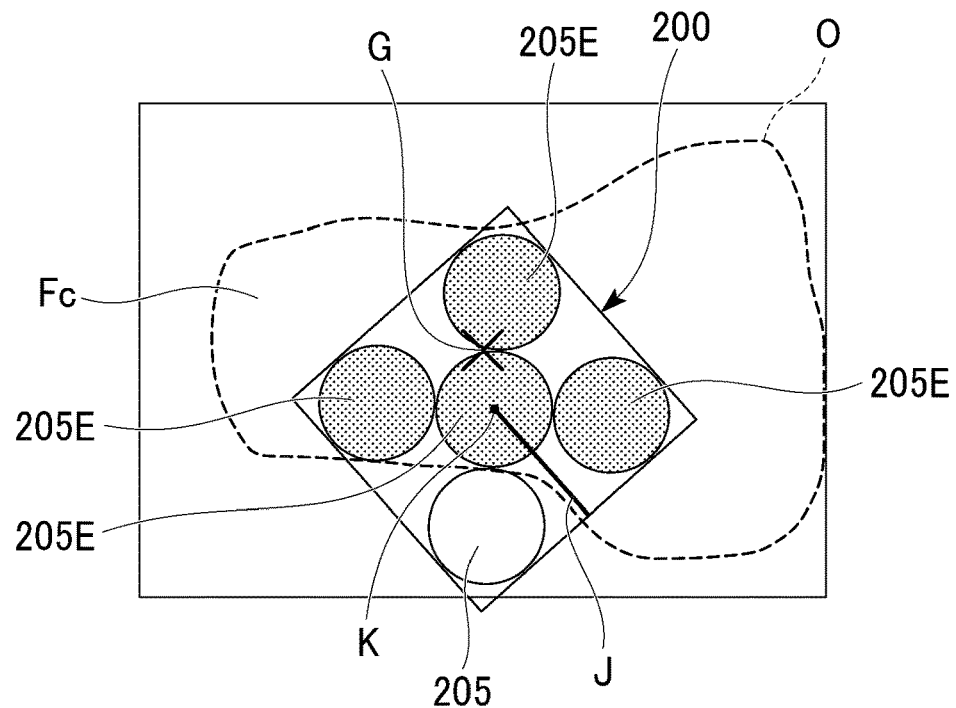
FIG. 13 is a diagram which shows an example of a holding method of the holder according to the embodiment.
Figure 14:
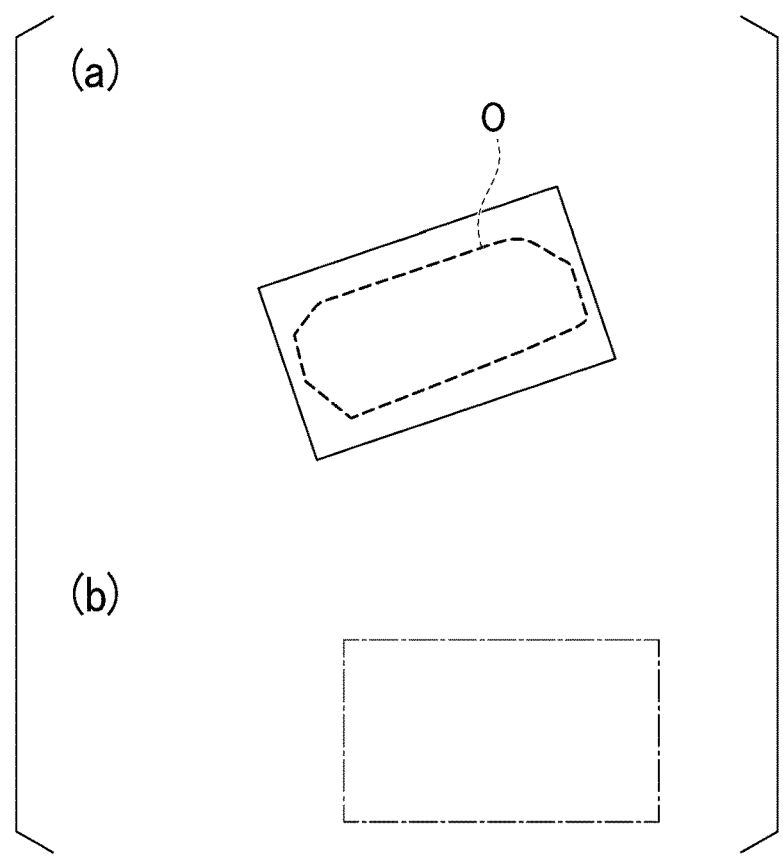
FIG. 14 is a diagram which shows an example of a current position and posture and a target position and posture of an object when the object is transported.

Next, an example of the holding method of the holder 200 will be described. The example of FIG. 13 shows a case in which the object O has a gourd shape. The holder 200 holds the object O in the vicinity of the center of gravity G of the object using four effective adsorption units 205E among five adsorption units 205.

Incidentally, in a general method, a holding method capable of ensuring a sufficient adsorption area for a surface on which the object O can be held is given priority (for example, refer to FIG. 8). However, in this case, when the gourd-shaped object O is lifted, there is a high possibility that a large moment is generated according to a size of the distance L between the contact surface center K and the center of gravity G of the object, and the object O peels off and falls from the holder 200.

On the other hand, in the present embodiment, a holding method in which the estimated holding safety factor ratio is equal to or greater than a target value is selected among the plurality of holding methods (refer to FIG. 13). That is, since a holding method capable of ensuring the adsorption area while suppressing a generated moment to be small is automatically calculated in the present embodiment, a safe holding operation is enabled.

In this manner, the controller 43 causes the holder 200 to hold the object on the basis of the estimated holding safety factor ratio calculated by the holding planning unit 31. The controller 43 controls an operation of the holder 200 such that the holder 200 holding the object O moves in the specific distribution direction H2 when the aspect ratio of the contact area in which the holder 200 and the object O are in contact is greater than 1.

Next, a holding method when the object is transported (when the object O is transported from the extraction source container V1 to the transport destination container V2) will be described. Each of FIGS. 14(a) and 14(b) shows examples of a current position and posture (a start position) and a target position and posture (a final position) of the object O when the object is transported.

Figure 15:
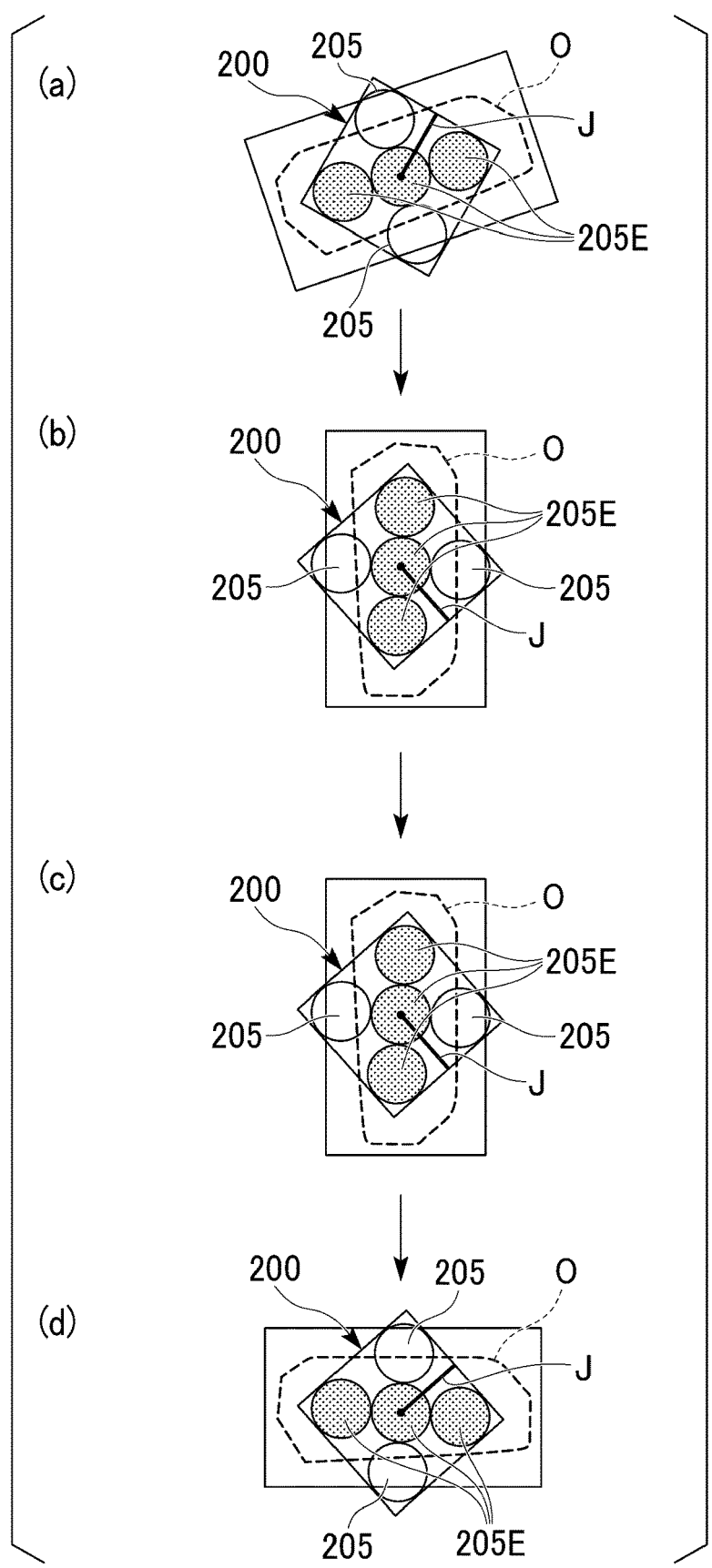
FIG. 15 is a diagram which shows a first example of a motion method of the holder according to the embodiment.

FIG. 15 is a diagram which shows a first example of a motion method of the holder 200 according to the embodiment. The first example has three effective adsorption units 205E. In the following description, the arrangement direction of the three effective adsorption units 205E is referred to as a "strong axis direction," and the direction orthogonal to the strong axis direction is referred to as a "weak axis direction."

In the example of FIG. 15, a case in which the weak axis direction obliquely intersects the transport direction of the object O when the object O is held by the holder 200 at the start position (refer to FIG. 15(a)) is shown. In this case, the holder 200 is rotated to a position at which the strong axis direction is substantially parallel to the transport direction. At this time, the holder 200 is rotated at a low speed (low speed rotation) to prevent the object O from falling from the start position to a first via-position (refer to FIG. 15(b)).

Thereafter, the holder 200 is moved such that the strong axis direction is along the transport direction of the object O. At this time, the holder 200 is moved at a high speed (high speed translation) such that the object O does not fall from the first via-position to a second via-position (refer to FIG. 15(c)).

Then, the holder 200 is rotated to a position at which the weak axis direction is substantially parallel to the transport direction so as to match the positon and posture of the object O at the final position (refer to FIG. 15(d)). At this time, the holder 200 is rotated at a low speed (low speed rotation) to prevent the object O from falling from the second via-position to the final position.

Figure 16:
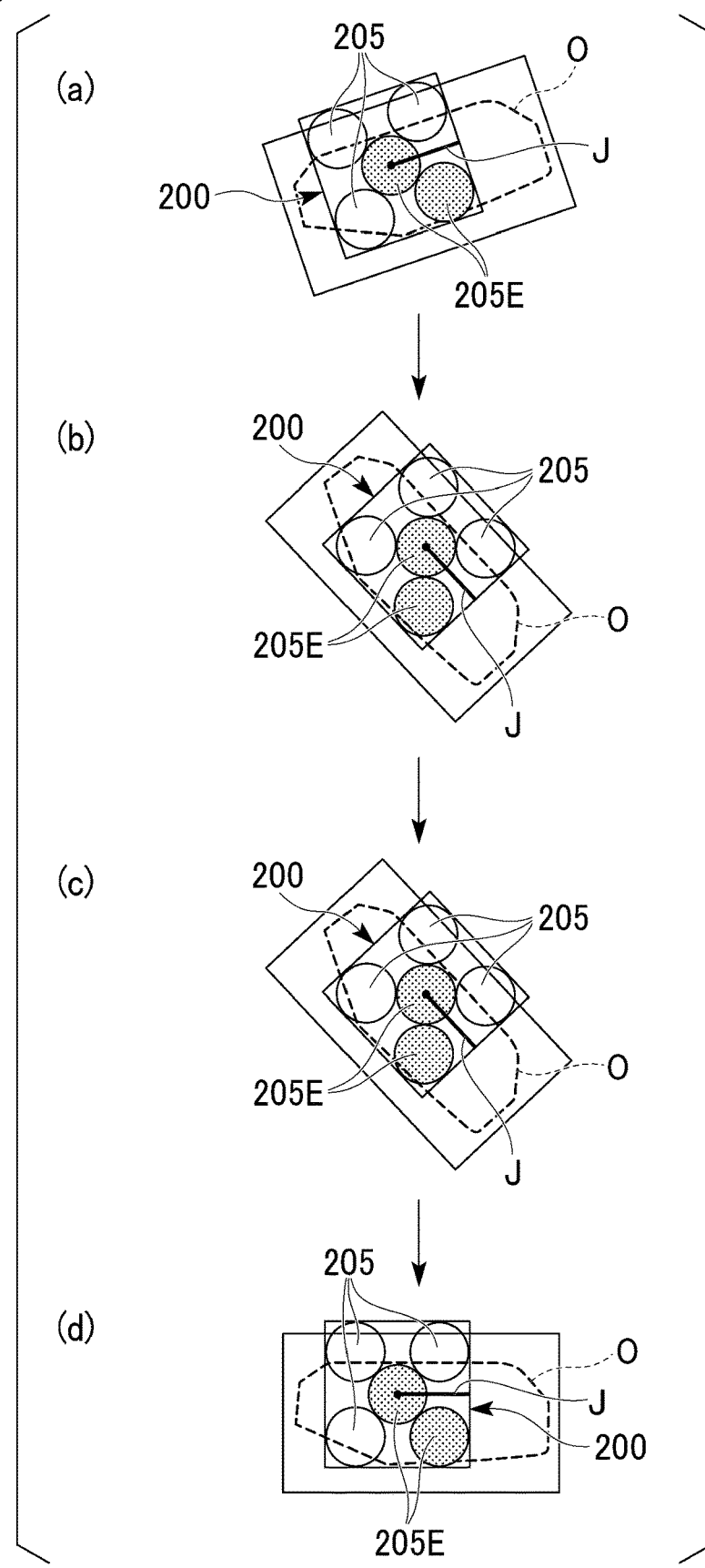
FIG. 16 is a diagram which shows a second example of the motion method of the holder according to the embodiment.

FIG. 16 is a diagram which shows a second example of the motion method of the holder 200 according to the embodiment. The example of FIG. 16 has two effective adsorption units 205E. The example of FIG. 16 differs from the example of FIG. 15 in the number of effective adsorption units 205E. In the following description, an arrangement direction of the two effective adsorption units 205E is referred to as a "strong axis direction," and a direction orthogonal to the strong axis direction is referred to as a "weak axis direction."

In the example of FIG. 16, a case in which the weak axis direction obliquely intersects the transport direction of the object O when the object O is held by the holder 200 at the start position (refer to FIG. 16(a)) is shown. In this case, the holder 200 is rotated to a position at which the strong axis direction is substantially parallel to the transport direction. At this time, the holder 200 is rotated at a low speed (a low speed rotation) such that the object O does not fall from the start positon to the first via-position (refer to FIG. 16(b)).

Thereafter, the holder 200 is moved such that the strong axis direction is along the transport direction of the object O. At this time, the holder 200 is moved at a high speed (high speed translation) such that the object O does not fall from the first via-position to the second via-position (refer to FIG. 16(c)).

Thereafter, the holder 200 is rotated to a position in which the weak axis direction obliquely intersects the transport direction so as to match the position and posture of the object O at the final position (refer to FIG. 16(d)). At this time, the holder 200 is rotated at a low speed (low speed rotation) such that the object O does not fall from the second via-position to the final position.

Incidentally, in the general method, a motion route is determined by an evaluation function (for example, a shortest route) regardless of the holding method. In this method, a rotational motion and a translation movement of the object O from the start position (refer to FIG. 14(a)) to the final position (refer to FIG. 14(b)) are executed at a defined speed. In this case, the object O is highly likely to fall in the transport process depending on the holding method.

On the other hand, in the present embodiment, the action planning unit 33 outputs different transport directions and speeds depending on the holding method, and changes the motion method. That is, in the present embodiment, it is possible to prevent the object O from falling in the transport process because a movement that suppresses occurrence of acceleration in the weak axis direction (a direction orthogonal to the arrangement direction of effective adsorption units 205E) is generated for each holding method.

In this manner, the action planning unit 33 plans a motion method including the motion route (for example, the transport route) of the holder 200. The holding planning unit 31 calculates a direction of contact distribution (for example, the strong axis direction) regarding a distribution on the contact surface on which the holder 200 and the object are in contact. The controller 43 causes the action planning unit 33 to plan the motion method of the holder 200 such that the estimated holding safety factor ratio is equal to or greater than a target value (for example, the object does not fall in the transport process) on the basis of the direction of contact distribution calculated by the holding planning unit 31. The controller 43 causes the holder 200 to operate on the basis of the motion method planned by the action planning unit 33.

In the present embodiment, the action planning unit 33 plans a plurality of motion methods (for example, an arbitrary transport route possible between the start position and the final position) in advance. The controller 43 causes the action planning unit 33 to select the best motion method capable of maintaining the highest estimated holding safety factor ratio among the plurality of motion methods on the basis of the direction of contact distribution calculated by the holding planning unit 31. The controller 43 causes the holder 200 to operate on the basis of the best motion method selected by the action planning unit 33.

Figure 17:
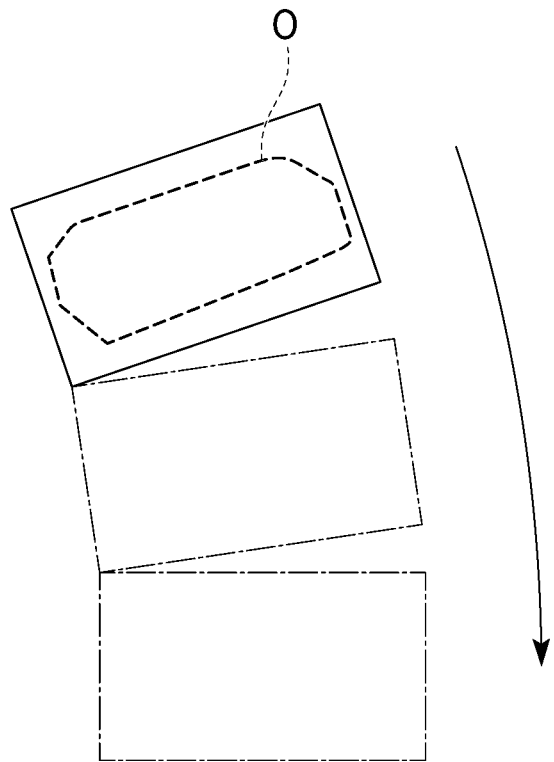
FIG. 17 is a diagram which shows an example of the current position and posture, a target route, and the target position and posture of an object when the object is transported.

Next, a holding method when the object O is transported from the extraction source container V1 to the transport destination container V2 under a constraint that the transport route is determined will be described. FIG. 17 is a diagram which shows an example of the current position and posture, the target route, and the target position and posture of the object O when the object is transported. For example, an arrow indicates the determined transport route in FIG. 17.

Figure 18:
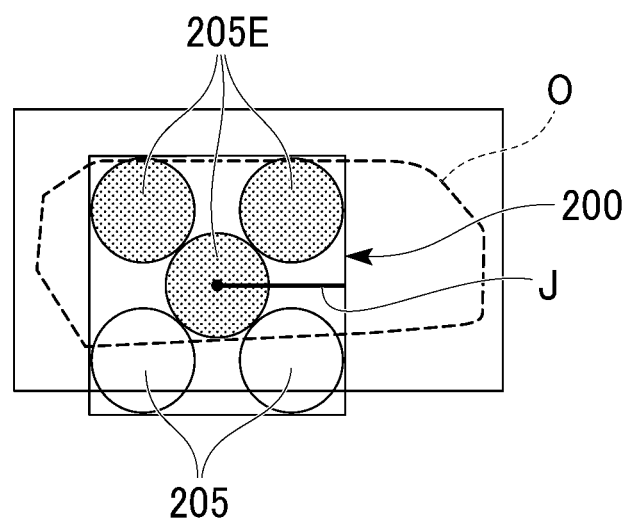
FIG. 18 is a diagram which shows a first example of the holding method of the holder according to the embodiment.

FIG. 18 is a diagram which shows a first example of the holding method of the holder 200 according to the embodiment.

In the example of FIG. 18, when the object is held by the holder 200 at the start position, a case in which the object O is held by the three effective adsorption units 205E arranged in an L shape so as to form a convex toward the transport direction is shown.

Figure 19:
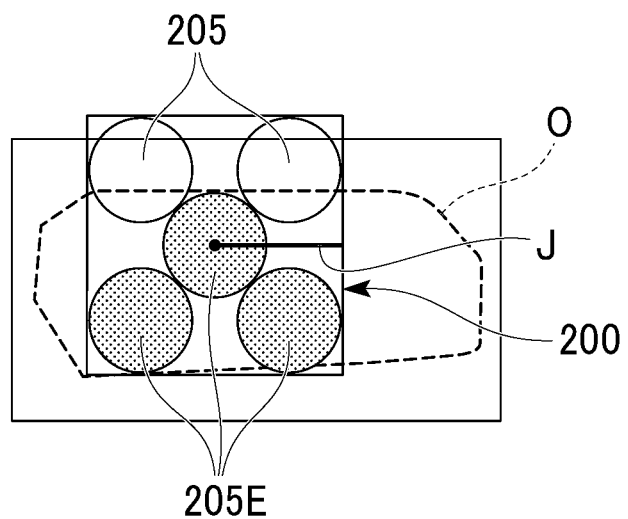
FIG. 19 is a diagram which shows a second example of the holding method of the holder according to the embodiment.

FIG. 19 is a diagram which shows a second example of the holding method of the holder 200 according to the embodiment.

In the example of FIG. 19, when the object is held by the holder 200 at the start position, the case in which the object O is held by the three effective adsorption units 205E disposed in an L shape so as to form a convex toward an opposite side to the transport direction is shown. That is, the arrangement of the effective adsorption units 205E (a direction of the L shape) in the example of the FIG. 19 is opposite to in the example of FIG. 18.

Incidentally, in the general method, an ascertaining method capable of ensuring an adsorption area as large as possible with respect to a surface on which the object O can be gripped is given priority. For example, the arrangement direction of the three effective adsorption units 205E is set along a longitudinal direction of the object O (not shown) to ensure a central area of the object O in a wide area. In this method (straight line arrangement), the weak axis direction (the direction orthogonal to the arrangement direction of the three effective adsorption units 205E) from the start position to the final position is substantially parallel to the transport direction of the object O, and thus the object O is highly likely to fall in the transport process.

On the other hand, in the present embodiment, in the holding planning unit 31, a holding method which is strong in an acceleration occurrence direction in the determined transport route is given priority. That is, in the present embodiment, under the constraint that the transport route is determined, a holding method is selected such that the strong axis direction is along the acceleration occurrence direction, and thus it is possible to prevent the object from falling in the transport process.

For example, in the examples of FIGS. 18 and 19, a total length of the three effective adsorption units 205E (a total length of the L-shaped arrangement) in the longitudinal direction of the object O is shorter than the length (a total length of a linear arrangement) in the general method. However, in the examples of FIGS. 18 and 19, since the distribution on the contact surface spreads in the transport direction of the object O from the start position to the final position as compared with in the general method, the object is less likely to fall in the transport process.

In this manner, the action planning unit 33 plans motion route information regarding the motion route (for example, the transport route) of the holder 200. The holding planning unit 31 calculates the holding method of the holder 200 on the basis of the motion route information (for example, a predetermined transport route) planned by the action planning unit 33 and calculates an estimated holding safety factor ratio for the holding method. The controller 43 causes the holder 200 to operate on the basis of the holding method calculated by the holding planning unit 31 such that the estimated holding safety factor ratio is equal to or greater than a target value (for example, the object does not fall in a transport process).

In the present embodiment, the action planning unit 33 plans a plurality of types of motion route information (for example, information on an arbitrary transport route that is possible between the start position and the final position) in advance. The holding planning unit 31 calculates a plurality of holding methods of the holder 200 on the basis of the plurality of types of motion route information (for example, information on a predetermined transport route among the plurality of transport routes) planned by the action planning unit 33 in advance, and calculates estimated holding safety factor ratios for the plurality of holding methods. The controller 43 causes the holder 200 to operate on the basis of the best holding method capable of maintaining the highest estimated holding safety factor ratio among the plurality of holding methods calculated by the holding planning unit 31.

Figure 20:
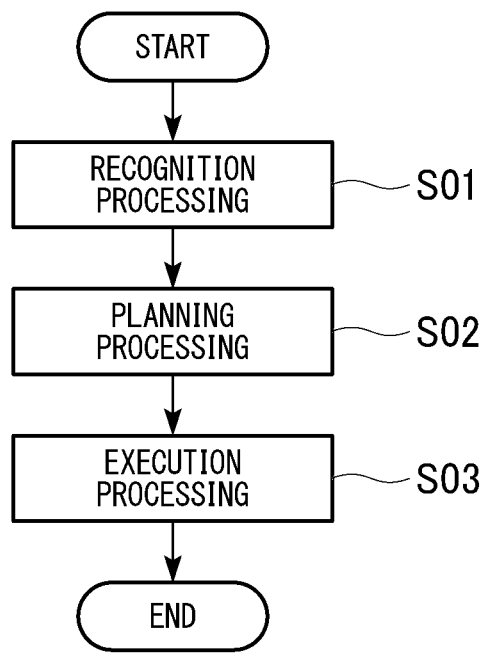
FIG. 20 is a flowchart which shows an example of a flow of processing of an arithmetic device according to the embodiment.

In the following description, an example of a flow of processing of the arithmetic device 12 will be described. FIG. 20 is a flowchart which shows an example of a flow of processing of the arithmetic device 12.

As shown in FIG. 4, the recognition unit 20 acquires information included in the management device 13 and information detected by the detection device 11 (the first detector 11A and the second detector 11B), and recognizes (recognition processing, step S01 of FIG. 20) states of various elements used for the control of the handling device 10 (refer to FIG. 1). For example, the recognition unit 20 generates the "object outline information," the "object position and posture information," the "object center of gravity information," and the "container information" as information on the states of various elements by performing predetermined image processing on image data or distance image data. The recognition unit 20 outputs these types of information to the planning unit 30.

The planning unit 30 generates a holding plan for holding the object O positioned in the extraction source container V1 using the holder 200, a release plan for releasing the object O held by the holder 200 in the transport destination container V2, and a movement plan for causing the object O held by the holder 200 to move to the transport destination container V2 (planning processing, step S02 of FIG. 20). The planning unit 30 outputs the generated holding plan, the release plan, and the movement plan to the execution unit 40.

The execution unit 40 executes a holding operation, a transport operation, and a release operation of the object O using the holder 200 on the basis of the movement plan output by the planning unit 30, the pressure information obtained from the pressure sensor or the like, and the force information obtained from the force sensor or the like (execution processing, step S03 of FIG. 20). The execution unit 40 detects a holding state of the holder 200 and a state of contact between the object O and the circumference of the object O held by the holder 200, and executes an appropriate retry operation.

According to the embodiment, the handling device 10 includes the holder 200, the holding planning unit 31, and the controller 43. The holder 200 is capable of holding an object. The holding planning unit 31 calculates the estimated holding safety factor ratio as a safety factor when the holder 200 holds an object. The controller 43 causes the holder 200 to hold the object on the basis of the estimated holding safety factor ratio calculated by the holding planning unit 31. With the above configuration, the following effects are achieved.

In general, when the adsorption surface of an object (for example, an outer surface of the object) has a complicated shape, a gripping method capable of ensuring an adsorption area as large as possible with respect to the surface on which the object can be gripped is given priority. However, under a condition that a weight of the object is large, even if the adsorption area can be ensured, the object may not be stably gripped such as falling of the object depending on the adsorption positon. On the other hand, according to the embodiment, since the object is held on the basis of the estimated holding safety factor ratio calculated by the holding planning unit 31, a safe holding method is considered rather than a holding method that simply ensures a large adsorption area. Therefore, it is possible to stably hold the object.

The holding planning unit 31 calculates the estimated holding safety factor ratio on the basis of the contact area information regarding an area in which the holder 200 and an object are in contact and the distance information regarding the distance L between the center K of the contact surface on which the holder 200 and the object are in contact and the center of gravity G of the object, and thereby the following effects are achieved.

Since the estimated holding safety factor ratio is calculated in consideration of the contact area information and the distance information, it is possible to more stably hold an object.

For example, the holding planning unit 31 calculates the estimated holding safety factor ratio on the basis of the weight of an object, and thereby the following effects are achieved. Under the condition that the weight of an object is large, since it is possible to hold the object near the center of gravity G of the object even at the cost of the adsorption area, it is possible to prevent the object from falling.

The holding planning unit 31 calculates the estimated holding safety factor ratio on the basis of a numerical value obtained by dividing a pressure P enabling the adsorption of the contact surface on which the holder 200 and the object are in contact by a value indicating a stress obtained by dividing the distance L between the center K of the contact surface of the holder 200 and the object and the center of gravity G of the object by the geometrical moment of inertia I with the contact surface of the holder 200 and the object set as a cross-section, and thereby the following effects are achieved.

The estimated holding safety factor ratio is calculated in consideration of the adsorption pressure P of the contact surface and the geometrical moment of inertia I, and thus it is possible to more stably hold the object.

The handling device 10 further includes an action planning unit 33 that plans a motion method including the motion route of the holder 200. The holding planning unit 31 calculates a direction of contact distribution regarding the distribution on the contact surface on which the holder 200 and the object are in contact. The controller 43 causes the action planning unit 33 to plan a motion method of the holder 200 such that the estimated holding safety factor ratio is equal to or greater than a target value on the basis of the direction of contact distribution calculated by the holding planning unit 31. The controller 43 causes the holder 200 to operate on the basis of the motion method planned by the action planning unit 33. With the above configuration, the following effects are achieved.

Since the holder 200 is operated on the basis of the motion method planned such that the estimated holding safety factor ratio is equal to or greater than the target value, it is possible to more stably hold the object.

The action planning unit 33 plans a plurality of motion methods in advance. The controller 43 causes the action planning unit 33 to select the best motion method capable of maintaining the highest estimated holding safety factor ratio among the plurality of motion methods on the basis of the direction of contact distribution calculated by the holding planning unit 31. The controller 43 causes the holder 200 to operate on the basis of the best motion method selected by the action planning unit 33. With the above configuration, the following effects are achieved.

Since the plurality of motion methods are planned in advance, calculation time of the controller 43 can be shortened as compared with in a case in which planning processing and selection processing of a motion method are performed in parallel. In addition, since the holder 200 is operated on the basis of the best motion method capable of maintaining the highest estimated holding safety factor ratio, which is selected among the plurality of motion methods, it is possible to more stably hold the object.

The handling device 10 further includes the action planning unit 33 which plans motion route information regarding a motion route of the holder 200. The holding planning unit 31 calculates the holding method of the holder 200 on the basis of motion route information planned by the action planning unit 33 and calculates the estimated holding safety factor ratio for the holding method. The controller 43 causes the holder 200 to operate on the basis of the holding method calculated by the holding planning unit 31 such that the estimated holding safety factor ratio is equal to or greater than a target value. With the above configuration, the following effects are achieved.

Since the holder 200 is operated on the basis of the holding method selected such that the estimated holding safety factor ratio is equal to or greater than the target value, it is possible to more stably hold the object.

The action planning unit 33 plans a plurality of pieces of motion route information in advance. The holding planning unit 31 calculates the plurality of holding methods of the holder 200 on the basis of the plurality of pieces of motion route information planned by the action planning unit 33 in advance, and calculates estimated holding safety factor ratios for the plurality of holding methods. The controller 43 causes the holder 200 to operate on the basis of the best holding method capable of maintaining the highest estimated holding safety factor ratio among the plurality of holding methods calculated by the holding planning unit 31. With the above configuration, the following effects are achieved.

Since the plurality of pieces of motion route information are planned in advance, the calculation time of the controller 43 can be shortened as compared with in a case in which planning processing of motion route information and selection processing of the holding method are performed in parallel. In addition, since the holder 200 is operated on the basis of the best holding method capable of maintaining the highest estimated holding safety factor ratio, which is selected among the plurality of holding methods, it is possible to more stably hold the object.

The handling device 10 includes the holder 200 capable of holding an object and, when the aspect ratio of the contact area in which the holder 200 and the object are in contact is greater than 1 and a direction intersecting the direction with the smallest spread degree in the distribution on the contact surface is set as the specific distribution direction H2, the controller 43 which controls the operation of the holder 200 such that the holder 200 holding the object moves in the specific distribution direction H2. With the above configuration, the following effects are achieved.

Since the holder 200 operates to move in the specific distribution direction H2 with a stronger bending with respect to the applied load than the direction with the smallest spread degree in the distribution on the contact surface, it is possible to stably hold the object.

In the embodiment, the specific distribution direction H2 is a direction orthogonal to the direction with the smallest spread degree in the distribution on the contact surface. Since the specific distribution direction H2 is a direction with the strongest bending with respect to the applied load, it is possible to more stably hold the object.

Note that the holder 200 has a holding surface on which the object is held, and the controller 43 may set a reference axis J (for example, an x axis) associated with the specific distribution direction H2 on the holding surface, and control the operation of the holder 200 on the basis of the reference axis J (refer to FIGS. 15, 16, 18, 19, and the like).

According to this configuration, since the holder 200 operates on the basis of the reference axis J associated with the specific distribution direction H2, it is possible to stably hold the object.

Note that a presentation unit (not shown) which outputs information indicating an exchange time of each adsorption unit 205 according to a degree of use of each adsorption unit 205 may be included. Note that the presentation unit may output the information to a display device (not shown)

having, for example, a display or the like, and cause the display device to display the information indicating the exchange time of each adsorption unit 205. Alternatively, the presentation unit may output the information to light emitters (not shown) each provided in the vicinity of each adsorption unit 205, and cause the light emission unit provided in the vicinity of an adsorption unit 205 which is at the exchange time to emit light.

In addition, the arithmetic device 12 may perform control to change a use frequency of each adsorption unit 205 according to the degree of use of each of the plurality of adsorption units 205. As a result, it is possible to improve durability of the handling device 10 (adsorption unit 205).

As described above, although several embodiments and modifications have been described, the embodiments are not limited to the examples described above. For example, several functional units of the arithmetic device 12 may be provided in the management device 13 instead of the handling device 10. For example, the recognition unit 20, the planning unit 30, the execution unit 40, and the storage may be provided in the management device 13. The planning unit 30 is an example of an "information processing unit."

According to at least one embodiment described above, the handling device 10 has the holder 200, the holding planning unit 31, and the controller 43. The holder 200 is capable of holding an object. The holding planning unit 31 calculates an estimated holding safety factor ratio as a safety factor when the holder 200 holds an object. The controller 43 causes the holder 200 to hold an object on the basis of the estimated holding safety factor ratio calculated by the holding planning unit 31. According to such configuration, it is possible to stably hold an object.

Note that a part or all of the transport system 1 in the embodiments described above may be realized by a computer. In this case, the realization may be performed by recording a program for realizing this control function in a computer-readable recording medium and causing a computer system to read and execute the program recorded in this recording medium.

Note that the "computer system" herein is a computer system embedded in the transport system 1 and includes an OS and hardware such as peripheral devices. Moreover, the "computer-readable recording medium" refers to a portable medium such as a flexible disk, a magneto-optical disc, a ROM, or a CD-ROM, or a storage device such as a hard disk embedded in the computer system.

Furthermore, the "computer-readable recording medium" may include mediums which dynamically holds a program for a short period of time like a communication line when the program is transmitted via a network such as the Internet or the communication line such as a telephone line, and mediums which holds the program for a certain period of time like a volatile memory inside the computer system serving as a server or a client in this case. In addition, the program may be a program for realizing a part of the functions described above, and, furthermore, may also be a program which can realize the functions described above in combination with a program already recorded in the computer system.

For example, the program may also be a program for causing a computer of the control device to execute a holding plan step of calculating an estimated holding safety factor ratio as a safety factor when the holder 200 capable of holding an object holds the object and a control step of causing the holder 200 to hold an object on the basis of the estimated holding safety factor ratio calculated in the holding plan step.

In addition, a part or all of the transport system 1 in the embodiments described above may be realized as an integrated circuit such as large scale integration (LSI). Each functional block of the transport system 1 may be individually turned into a processor, or a part or all thereof may be integrated into a processor. Moreover, a method of making an integrated circuit is not limited to the LSI, and may be realized by a dedicated circuit or a general-purpose processor. In addition, when a technology of making an integrated circuit, which replaces the LSI has emerged due to an advance in a semiconductor technology, an integrated circuit based on the technology may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handling device comprising:
a holder capable of holding an object;
a calculator that calculates an estimated holding safety factor when the holder holds the object; and
a controller that causes the holder to hold the object on the basis of the estimated holding safety factor calculated by the calculator,
wherein the controller changes a moving speed of the holder on the basis of the estimated holding safety factor, and
wherein the estimated holding safety factor is a ratio calculated according to a following equation:

$$\text{ratio} = \frac{P}{M \times \frac{R}{I}},$$

where P is an adsorption pressure of an arbitrary holding method, M is a moment determined by a distance L between a contact surface center K and a center of gravity G of the object, R is a shortest distance between an adsorption surface contour and the center of gravity G of the object; and I is a geometrical moment of inertia determined by an arbitrary holding method,
wherein the controller controls, when an aspect ratio of a contact area in which the holder and the object are in contact is greater than 1 and a direction intersecting a direction with the smallest spread degree in distribution on a contact surface is set as a specific distribution direction, an operation of the holder such that the holder holding the object moves in the specific distribution direction, and
wherein, in the contact area, a length of the contact area corresponds to a length in a direction with a largest spread degree in the distribution on the contact surface, and a width of the contact area corresponds to a length in the direction with the smallest spread degree in the distribution on the contact surface as a direction orthogonal to a longitudinal direction of the length.

2. The handling device according to claim 1,
wherein the calculator calculates the estimated holding safety factor on the basis of contact area information on an area in which the holder and the object are in contact and distance information on a distance between a center of a contact surface on which the holder and the object are in contact and a center of gravity of the object.

3. The handling device according to claim 1,
wherein the calculator calculates the estimated holding safety factor on the basis of a numerical value obtained by dividing a pressure enabling adsorption of a contact surface on which the holder and the object are in contact by a value indicating a stress obtained by dividing a distance between a center of the contact surface of the holder and the object and a center of gravity of the object by a geometrical moment of inertia with the contact surface of the holder and the object set as a cross-section.

4. The handling device according to claim 1, further comprising:
an action planning unit that plans a motion method including a motion route of the holder,
wherein the calculator calculates a direction of contact distribution for a distribution on a contact surface on which the holder and the object are in contact,
the controller causes the action planning unit to plan the motion method of the holder such that the estimated holding safety factor is equal to or greater than a target value on the basis of the direction of contact distribution calculated by the calculator, and
the controller causes the holder to operate on the basis of the motion method planned by the action planning unit.

5. The handling device according to claim 4,
wherein the action planning unit plans a plurality of motion methods in advance,
the controller causes the action planning unit to select the best motion method capable of maintaining the highest estimated holding safety factor among the plurality of motion methods on the basis of the direction of contact distribution calculated by the calculator, and
the controller causes the holder to operate on the basis of the best motion method selected by the action planning unit.

6. The handling device according to claim 1, further comprising:
an action planning unit that plans motion route information on a motion route of the holder,
wherein the calculator calculates a holding method of the holder on the basis of the motion route information planned by the action planning unit and calculates the estimated holding safety factor for the holding method, and
the controller causes the holder to operate on the basis of the holding method calculated by the calculator such that the estimated holding safety factor is equal to or greater than a target value.

7. The handling device according to claim 6,
wherein the action planning unit plans a plurality of types of motion route information in advance,
the calculator calculates a plurality of holding methods of the holder on the basis of the plurality of types of motion route information planned by the action planning unit in advance and calculates the estimated holding safety factor for the plurality of holding method, and
the controller causes the holder to operate on the basis of the best holding method capable of maintaining the highest estimated holding safety factor among the plurality of holding methods calculated by the calculator.

8. A handling device, comprising:
a holder configured to hold an object; and
a controller configured to control, when determining that an aspect ratio of a contact area in which the holder and the object are in contact is greater than 1 and a direction intersecting a direction with a smallest spread degree in a distribution on contact surface is set as a specific distribution direction, an operation of the holder such that the holder holding the object moves in the specific distribution direction, wherein
in the contact area, in the aspect ratio, a length of the contact area corresponds to a length in a direction with a largest spread degree in the distribution on the contact surface, and a width of the contact area corresponds to a length in the direction with a smallest spread degree in the distribution on the contact surface as a direction orthogonal to a longitudinal direction of the length, and
the specific distribution direction is a direction with a stronger bending with respect to an applied load than the direction with the smallest spread degree in the distribution on the contact surface.

9. The handling device according to claim 8,
wherein the holder has a holding surface for holding the object, and
the controller is further configured to set a reference axis associated with the specific distribution direction on the holding surface, and control the operation of the holder based on the reference axis.

10. A control device comprising:
a calculator that calculates an estimated holding safety factor when a holder capable of holding an object holds the object; and
a controller that causes the holder to hold the object on the basis of the estimated holding safety factor calculated by the calculator,
wherein the controller changes a moving speed of the holder on the basis of the estimated holding safety factor; and
wherein the estimated holding safety factor is a ratio calculated according to a following equation:

$$\text{ratio} = \frac{P}{M \times \frac{R}{I}},$$

where P is an adsorption pressure of an arbitrary holding method; is a moment determined by a distance L between a contact surface center K and a center of gravity G of object R is a shortest distance between an adsorption surface contour and the center of gravity G of the object, and I is a geometrical moment of inertia determined by an arbitrary holding method,
wherein the controller controls, when an aspect ratio of a contact area in which the holder and the object are in contact is greater 1 and a direction intersecting a direction with the smallest spread degree in distribution on a contact surface is set as a specific distribution direction, an operation of the holder such that the holder holding the object moves in the specific distribution direction, and
wherein, in the contact area, a length of the contact area corresponds to a length in a direction with a largest spread degree in the distribution on the contact surface, and a width of the contact area corresponds to a length in the direction with the smallest spread degree in the distribution on the contact surface as a direction orthogonal to a longitudinal direction of the length.

11. The control device according to claim 10, wherein the calculator calculates the estimated holding safety factor on the basis of contact area information on an area in which the holder and the object are in contact and distance information on a distance between a center of a contact surface on which the holder and the object are in contact and a center of gravity of the object.

12. The control device according to claim 10, wherein the calculator calculates the estimated holding safety factor on the basis of a numerical value obtained by dividing a pressure enabling adsorption of a contact surface on which the holder and the object are in contact by a value indicating a stress obtained by dividing a distance between a center of the contact surface of the holder and the object and a center of gravity of the object by a geometrical moment of inertia with the contact surface of the holder and the object set as a cross-section.

13. The control device according to claim 10, further comprising:
an action planning unit that plans a motion method including a motion route of the holder,
wherein the calculator calculates a direction of contact distribution regarding a distribution on a contact surface on which the holder and the object are in contact,
the controller causes the action planning unit to plan the motion method of the holder such that the estimated holding safety factor is equal to or greater than a target value on the basis of the direction of contact distribution calculated by the calculator, and
the controller causes the holder to operate on the basis of the motion method planned by the action planning unit.

14. The control device according to claim 10, further comprising:
an action planning unit that plans motion route information on a motion route of the holder,
wherein the calculator calculates a holding method of the holder on the basis of the motion route information planned by the action planning unit and calculates the estimated holding safety factor for the holding method, and
the controller causes the holder to operate on the basis of the holding method calculated by the calculator such that the estimated holding safety factor is equal to or greater than a target value.

15. A computer program product comprising a non-transitory computer-readable recording medium on which an executable program is recorded, the program instructing a computer to function as the control device of claim 10.

* * * * *